United States Patent
Ahn et al.

(10) Patent No.: US 11,716,229 B2
(45) Date of Patent: Aug. 1, 2023

(54) PAM-N RECEIVER CAPABLE OF ADAPTIVELY ADJUSTING THRESHOLD VOLTAGES DETERMINING LEVEL OF DATA IN RECEIVED SIGNAL AND METHOD OF ADAPTIVELY ADJUSTING THRESHOLD VOLTAGES OF PAM-N RECEIVER

(71) Applicant: UNIVERSITY OF SEOUL INDUSTRY COOPERATION FOUNDATION, Seoul (KR)

(72) Inventors: Hyeon-Woo Ahn, Seoul (KR); Yo-Han Kim, Seoul (KR); Soo-Hwan Yoo, Seoul (KR); Jae-Geol Lee, Seoul (KR); Hyo-Goon Lim, Seoul (KR); Il-Soo Lee, Seoul (KR); Yongsam Moon, Gwacheon-si (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 17/845,369

(22) Filed: Jun. 21, 2022

(65) Prior Publication Data
US 2023/0188391 A1    Jun. 15, 2023

(30) Foreign Application Priority Data

Dec. 10, 2021    (KR) .................. 10-2021-0176428

(51) Int. Cl.
*H04B 1/06*    (2006.01)
*H04B 1/16*    (2006.01)
(Continued)

(52) U.S. Cl.
CPC .............. *H04L 27/06* (2013.01); *H04L 27/01* (2013.01)

(58) Field of Classification Search
CPC ..... H04L 25/4917; H04L 25/40; H04L 27/06; H04L 27/02; H04L 27/01; H04B 1/16
See application file for complete search history.

(56) References Cited

U.S. PATENT DOCUMENTS

| 9,425,997 B2 * | 8/2016 | Zerbe ................ H01L 21/76897 |
| 2013/0243056 A1 * | 9/2013 | Chmelar ................ H04L 7/033 375/295 |
| 2020/0145261 A1 * | 5/2020 | Navid .................... H04L 25/061 |

FOREIGN PATENT DOCUMENTS

KR    10-2220171 B1    2/2021

OTHER PUBLICATIONS

"A 40-to-56 GB/s PAM-4 Receiver With Ten-Tap Direct Decision-Feedback Equalization in 16-nm FinFET", Jay Im et al., IEEE Journal of Solid-State Circuits (vol. 52, Issue: 12, Dec. 2017).
(Continued)

*Primary Examiner* — David S Huang
(74) *Attorney, Agent, or Firm* — Stein IP, LLC

(57) ABSTRACT

A PAM-N receiver capable of adaptively adjusting threshold voltages determining a level of a received signal and a method of adaptively adjusting threshold voltages thereof are disclosed. According to the method of the present invention, the result of comparison between reference data levels and the level of data in the received signal are used to adjust the reference data levels, and the threshold voltages of a PAM-N receiver are adaptively calculated from the adjusted reference data levels, thereby reflecting transmission line conditions and Inter-Symbol Interference.

10 Claims, 19 Drawing Sheets

(51) Int. Cl.
    *H04L 27/01*         (2006.01)
    *H04L 27/06*         (2006.01)
    *H04L 25/49*         (2006.01)

(56) References Cited

OTHER PUBLICATIONS

"A 56-GB/s PAM4 Receiver With Low-Overhead Techniques for Threshold and Edge-Based DFE FIR- and IIR-Tap Adaptation in 65-nm CMOS", Ashkan Roshan-Zamir et al., IEEE J. Solid-State Circuits, vol. 54, No. 3, Mar. 2019.

\* cited by examiner

<Prior Art>

<Prior Art>

<Prior Art>

<Prior Art>

<Prior Art>

<Prior Art>

<Prior Art>

PAM-N RECEIVER CAPABLE OF ADAPTIVELY ADJUSTING THRESHOLD VOLTAGES DETERMINING LEVEL OF DATA IN RECEIVED SIGNAL AND METHOD OF ADAPTIVELY ADJUSTING THRESHOLD VOLTAGES OF PAM-N RECEIVER

This non-provisional U.S. patent application claims priority under 35 U.S.C. § 119 of Korean Patent Application No. 10-2021-0176428 filed on Dec. 10, 2021, in the Korean Intellectual Property Office, the entire contents of which are hereby incorporated by reference.

FIELD

The present invention relates to a PAM-N receiver capable of adaptively adjusting threshold voltages determining a level of data in a received signal and a method of adaptively adjusting threshold voltages of a PAM-N receiver.

DESCRIPTION OF THE RELATED ART

Various methods are used in order to transmit digital signals at high speed. While binary data are transmitted conventionally, multi-level pulse amplitude modulation (PAM) has been proposed to transmit digital data at high speed.

FIG. 1A through FIG. 1D are diagrams illustrating waveforms of binary PAM (PAM-2) and multi-level PAM (PAM-4, PAM-8 and PAM-N) signals, respectively.

FIG. 1A illustrates binary data having values '0' and '1'. That is, in FIG. 1A, a two-level PAM (PAM-2) signal is illustrated. While PAM-2 signal is robust to noise, PAM-2 has a limitation in increasing signal data rate.

In order to overcome the limitation of PAM-2, PAM-4, PAM-8 and PAM-N have been proposed.

As shown in FIG. 1B, in PAM-4, data having values of '00', '01', '10' and '11' are modulated into a signal with four data levels.

Similarly, as shown in FIG. 1C, in PAM-8, data having values of '000', '001', '010', '011', '100', '101', '110' and '111' are modulated into a signal with eight data levels.

Similarly, as shown in FIG. 1D, in PAM-N, data having values of '00 . . . 00', '00 . . . 01', . . . , '11 . . . 11' are modulated into a signal with N data levels. Here, N is a natural number, and typically, satisfies $N=2^n$ (where n is a natural number). If $N=2^n$, one pulse contains n bits of data. However, N is not limited to a natural number that satisfies $N=2^n$.

As a result, in PAM-4, PAM-8 and PAM-N, data may be transmitted at two, three and n (when $N=2^n$) times faster compared to PAM-2, respectively. However, PAM-4, PAM-8 and PAM-N are more susceptible to attenuation and noise when compared to PAM-2. Therefore, an equalizer capable of equalizing the received signal is necessary in PAM-4, PAM-8 and PAM-N.

FIG. 2 is a block diagram illustrating an equalizer and a sampler of a conventional PAM-N receiver.

Referring to FIG. 2, the conventional PAM-4 receiver 10 includes an equalizer 20 and a sampler 30.

The equalizer 20 equalizes a received signal RS to generate an equalized signal $EQ_{OUT}$.

The sampler 30 determines the level of the data contained in the output signal $EQ_{OUT}$. For example, a conventional PAM-4 receiver shown in FIG. 2 determines the level of the data contained in the output signal $EQ_{OUT}$ to identify the received data as one of "00", "01", "10" and "11".

FIG. 3A is a diagram schematically illustrating a signal processing process of the conventional PAM-4 receiver 10. As shown in FIG. 3A, assuming that the transmitted signal TS is a digital signal having four data levels "00", "01", "10" and "11", a received signal RS is virtually an analog signal due to the characteristics of the transmission line such as LPF characteristic thereof. While a signal $EQ_{OUT}$ obtained by equalizing the received signal RS is more similar in shape to the transmitted digital signal, the signal $EQ_{OUT}$ still differs from the transmitted signal TS. Therefore, the signal $EQ_{OUT}$ must be converted into a digital signal having four data levels using the sampler 30.

FIG. 3B is a diagram schematically illustrating a process for processing the signal $EQ_{OUT}$ by the sampler 30.

Referring to FIG. 3B, when the level of the data contained in the signal $EQ_{OUT}$ is greater than threshold voltage $VTH_3$, the sampler 30 determines the data as "11". When the level of the data contained in the signal $EQ_{OUT}$ is greater than threshold voltage $VTH_2$ but smaller than $VTH_3$, the sampler 30 determines the data as "10". When the level of the data contained in the signal $EQ_{OUT}$ is greater than threshold voltage $VTH_1$ but smaller than $VTH_2$, the sampler 30 determines the data as "01". When the level of the data contained in the signal $EQ_{OUT}$ is smaller than threshold voltage $VTH_1$, the sampler 30 determines the data as "00".

However, the problem lies in that the data level of the received signal is subject to change depending on the characteristics of the transmission line.

For example, when a signal TS where the data corresponding to "11" has a data level of 400 mV is transmitted, the level the data corresponding to "11" contained in the received signal RS (or equalized signal $EQ_{OUT}$) may be 300 mV or 250 mV depending on the characteristics of the transmission line. That is, the amplitude of the transmitted signal TS may differ from that of the received signal RS. However, since these characteristics are not reflected in the threshold voltages $VTH_1$, $VTH_2$ and $VTH_3$ which are the criteria for determining the data level, it is very likely that the data level cannot be accurately determined.

SUMMARY OF THE INVENTION

It is an object of the present invention to provide a PAM-N receiver and a method of adaptively adjusting threshold voltages thereof capable of adaptively adjusting threshold voltages for determining levels of data in a received signal.

In order to achieve the object of the present invention, there is provided a method of adjusting threshold voltages of a PAM-N receiver comprising a sampler comparing a level of data contained in an equalized signal $EQ_{OUT}$ with first reference data level $DLR_1$ through $N^{th}$ reference data level $DLR_N$ and first threshold voltage $VTH_1$ through $(N-1)^{th}$ threshold voltage $VTH_{(N-1)}$, the method comprising: (a) determining the level of the data by comparing the level of the data with the first threshold voltage $VTH_1$ through the $(N-1)^{th}$ threshold voltage $VTH_{(N-1)}$; (b) comparing the level of the data determined in (a) as $K^{th}$ data level $DL_K$ with $K^{th}$ reference data level $DLR_K$; (c) increasing the $K^{th}$ reference data level $DLR_K$ when $DL_K$ is greater than $DLR_K$ according to comparison result obtained in (b) and decreasing the $K^{th}$ reference data level $DLR_K$ when $DL_K$ is smaller than $DLR_K$ according to the comparison result obtained in (b) to generate $K^{th}$ updated reference data level $DLUR_K$; and (d) updating at least one of $(K-1)^{th}$ threshold voltage $VTH_{(K-1)}$ and $K^{th}$ threshold voltage $VTH_K$ with $(K-1)^{th}$ updated threshold voltage $VUTH_{(K-1)}$ and $K^{th}$ updated threshold voltage $VUTH_K$ by calculating at least one of the $(K-1)^{th}$ updated threshold voltage $VUTH_{(K-1)}$ and the $K^{th}$ updated threshold voltage $VUTH_K$ from the $K^{th}$ updated reference data level $DLUR_K$ (where N is a natural number equal to or greater than 2, K is a natural number satisfying $1 \leq K \leq N$, $DL_K$ is one of $DL_1$ through $DL_N$ satisfying $DL_1 < DL_2 < \ldots < DL_{(N-1)} < DL_N$, $DLR_K$ is one of $DLR_1$ through $DLR_N$ satisfying $DLR_1 < DLR_2 < \ldots < DLR_{(N-1)} < DLR_N$, $VTH_{(K-1)}$ is one of $VTH_1$ through $VTH_{(N-1)}$ satisfying $VTH_1 < VTH_2 < \ldots < VTH_{(N-2)} < VTH_{(N-1)}$).

It is preferable that the method may further comprise: (e) updating $(N-K+1)^{th}$ threshold voltage $VTH_{(N-k+1)}$ with $(N-K+1)^{th}$ updated threshold voltage $VUTH_{(N-K+1)}$ obtained by inverting the $(K-1)^{th}$ updated threshold voltage $VUTH_{(K-1)}$ when the equalized signal $EQ_{OUT}$ is a differential signal (where, K is a natural number satisfying $N/2+1 < K \leq N$).

It is preferable that (d) comprises: (d-1) calculating the $(K-1)^{th}$ updated threshold voltage $VUTH_{(K-1)}$ from an average of $(K-1)^{th}$ reference data level $DLR_{(K-1)}$ and the $K^{th}$ updated reference data level $DLUR_K$; and (d-2) updating the $(K-1)^{th}$ threshold voltage $VTH_{(K-1)}$ with the $(K-1)^{th}$ updated threshold voltage $VUTH_{(K-1)}$.

It is preferable that (d) comprises: (d-3) calculating the $K^{th}$ updated threshold voltage $VUTH_K$ from an average of $(K+1)^{th}$ reference data level $DLR_{(K+1)}$ and the $K^{th}$ updated reference data level $DLUR_K$; and (d-4) updating the $K^{th}$ threshold voltage $VTH_K$ with the $K^{th}$ updated threshold voltage $VUTH_K$.

It is preferable that (d) comprises: (d-1) calculating the $(K-1)^{th}$ updated threshold voltage $VUTH_{(K-1)}$ from an average of $(K-1)^{th}$ reference data level $DLR_{(K-1)}$ and the $K^{th}$ updated reference data level $DLUR_K$; (d-2) updating the $(K-1)^{th}$ threshold voltage $VTH_{(K-1)}$ with the $(K-1)^{th}$ updated threshold voltage $VUTH_{(K-1)}$; (d-3) calculating the $K^{th}$ updated threshold voltage $VUTH_K$ from an average of $(K+1)^{th}$ reference data level $DLR_{(K+1)}$ and the $K^{th}$ updated reference data level $DLUR_K$; and (d-4) updating the $K^{th}$ threshold voltage $VTH_K$ with the $K^{th}$ updated threshold voltage $VUTH_K$.

It is preferable that the method further comprises: (h) performing, when the received signal contains a plurality of data, (a) through (d) for each of the plurality of data.

There is also provided a PAM-N receiver comprising: an equalizer generating an equalized signal $EQ_{OUT}$ containing data having at least one of first data level $DL_1$ through $N^{th}$ data level $DL_N$ obtained by equalizing a received signal; a sampler determining a level of the data by comparing the level of the data with first reference data level $DLR_1$ through $N^{th}$ reference data level $DLR_N$ and first threshold voltage $VTH_1$ through $(N-1)^{th}$ threshold voltage $VTH_{(N-1)}$; and a controller adjusting the first reference data level $DLR_1$ through the $N^{th}$ reference data level $DLR_N$ and the first threshold voltage $VTH_1$ through the $(N-1)^{th}$ threshold voltage $VTH_{(N-1)}$ according to an output signal $SMPL_{OUT}$ indicating a result of comparison performed by the sampler; wherein the sampler comprises a $K^{th}$ data level comparator outputting: "1" as the output signal $SMPL_{OUT}$ when $DL_K$ is greater than $DLR_K$; and "0" as the output signal $SMPL_{OUT}$ when $DL_K$ is smaller than $DLR_K$ by comparing the level of the data determined to have $K^{th}$ data level $DL_K$ with $K^{th}$ reference data level $DLR_K$; and wherein the controller comprises: a reference data level controller generating an $K^{th}$ updated reference data level $DLUR_K$ obtained by increasing the $K^{th}$ reference data level $DLR_K$ when an output of the $K^{th}$ data level comparator is "1" and by decreasing the $K^{th}$ reference data level $DLR_K$ when the output of the $K^{th}$ data level comparator is "0"; and a threshold voltage controller updating at least one of $(K-1)^{th}$ threshold voltage $VTH_{(K-1)}$ and $K^{th}$ threshold voltage $VTH_K$ with $(K-1)^{th}$ updated threshold voltage $VUTH_{(K-1)}$ and $K^{th}$ updated threshold voltage $VUTH_K$ by calculating at least one of the $(K-1)^{th}$ updated threshold voltage $VUTH_{(K-1)}$ and the $K^{th}$ updated threshold voltage $VUTH_K$ from the $K^{th}$ updated reference data level $DLUR_K$ (where N is a natural number equal to or greater than 2, K is a natural number satisfying $1 \leq K \leq N$, $DL_K$ is one of $DL_1$ through $DL_N$ satisfying $DL_1 < DL_2 < \ldots < DL_{(N-1)} < DL_N$, $DLR_K$ is one of $DLR_1$ through $DLR_N$ satisfying $DLR_1 < DLR_2 < \ldots < DLR_{(N-1)} < DLR_N$, $VTH_{(K-1)}$ is one of $VTH_1$ through $VTH_{(N-1)}$ satisfying $VTH_1 < VTH_2 < \ldots < VTH_{(N-2)} < VTH_{(N-1)}$).

It is preferable that the threshold voltage controller updates $(N-K+1)^{th}$ threshold voltage $VTH_{(N-K+1)}$ with $(N-K+1)^{th}$ updated threshold voltage $VUTH_{(N-K+1)}$ obtained by inverting the $(K-1)^{th}$ updated threshold voltage $VUTH_{(K-1)}$ when the equalized signal $EQ_{OUT}$ is a differential signal (where, K is a natural number satisfying $N/2+1 < K \leq N$).

It is preferable that the threshold voltage controller: calculates the $(K-1)^{th}$ updated threshold voltage $VUTH_{(K-1)}$ from an average of $(K-1)^{th}$ reference data level $DLR_{(K-1)}$ and the $K^{th}$ updated reference data level $DLUR_K$; and updates the $(K-1)^{th}$ threshold voltage $VTH_{(K-1)}$ with the $(K-1)^{th}$ updated threshold voltage $VUTH_{(K-1)}$.

It is preferable that the threshold voltage controller: calculates the $K^{th}$ updated threshold voltage $VUTH_K$ from an average of $(K+1)^{th}$ reference data level $DLR_{(K+1)}$ and the $K^{th}$ updated reference data level $DLUR_K$; and updates the $K^{th}$ threshold voltage $VTH_K$ with the $K^{th}$ updated threshold voltage $VUTH_K$.

Hereinafter, a PAM-N receiver and a method of adaptively adjusting threshold voltages thereof capable of adaptively adjusting threshold voltages for determining data levels of a received signal according to the present invention will be described in detail with reference to the accompanying drawings.

First, data levels of a signal RS received by the PAM-N receiver according to the present invention will be described.

Figure 4:
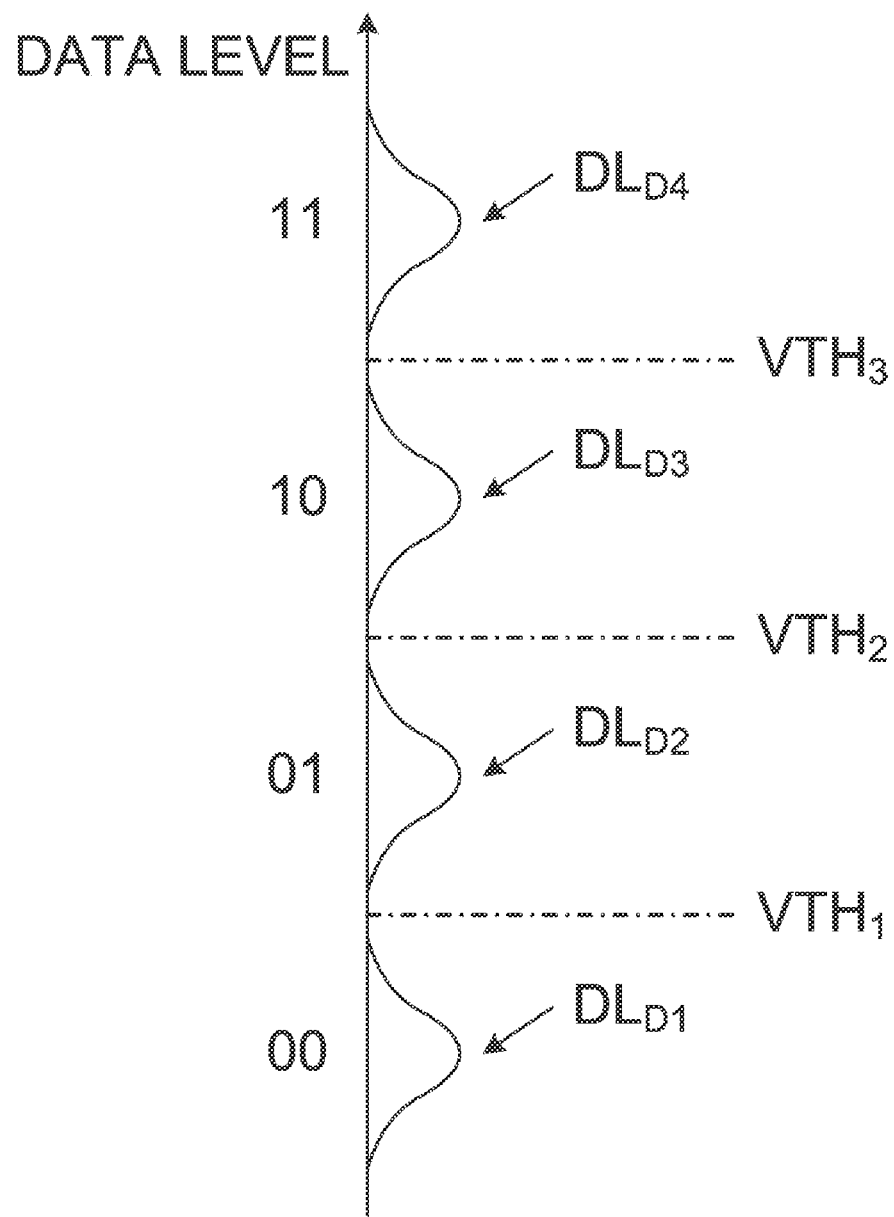
FIG. 4 is a diagram illustrating a distribution of data levels of a signal RS received by a PAM-4 receiver.

FIG. 4 is a diagram illustrating a distribution of data levels of a received signal RS wherein a distribution of data levels of a signal RS received by a PAM-4 receiver is exemplified. While the data levels of the signal RS received by the PAM-4 receiver is exemplified for convenience of description, the signal RS is not limited to ones received by a PAM-4 receiver.

Referring to FIG. 4, when a PAM-4 transmitter transmits data "11", the data level of the data "11" received by the PAM-4 receiver should be greater than a threshold voltage $VTH_3$. Specifically, when the PAM-4 receiver receives a plurality of data "11", each of the plurality of data "11" may have different data levels due to Inter-Symbol Interference (ISI). The ISI is a phenomenon in which the preceding data affects the following data. For example, when data "00" and "11" are sequentially transmitted and received, the received data "11" is likely to have a relatively low data level, and when data "10" and "11" are sequentially transmitted and received, the received data "11" is likely to have a relatively high data level. Similarly, when data "11" and "00" are sequentially transmitted and received, the received data "00" is likely to have a relatively high data level, and when data "01" and "00" are sequentially transmitted and received, the received data "00" is likely to have a relatively low data level. As a result, even when the same data "11" are repeatedly transmitted, the data levels of the received data "11" differ and distributed throughout a certain range, e.g. follow a distribution $DL_{D4}$ shown in FIG. 4.

When the PAM-4 transmitter transmits data "10", the data level of the data "10" received by the PAM-4 receiver should be greater than a threshold voltage $VTH_2$ and less than the threshold voltage $VTH_3$. As described above, even when the same data "10" are repeatedly transmitted, the data levels of the received data "10" differ due to ISI and distributed throughout a certain range, e.g. follow a distribution $DL_{D3}$ shown in FIG. 4.

When the PAM-4 transmitter transmits data "01", the data level of the data "01" received by the PAM-4 receiver should be greater than a threshold voltage $VTH_1$ and less than the threshold voltage $VTH_2$. As described above, even when the same data "01" are repeatedly transmitted, the data levels of the received data "01" differ due to ISI and distributed throughout a certain range, e.g. follow a distribution $DL_{D2}$ shown in FIG. 4.

When the PAM-4 transmitter transmits data "00", the data level of the data "00" received by the PAM-4 receiver should be less than the threshold voltage $VTH_1$. As described above, even when the same data "00" are repeatedly transmitted, the data levels of the received data "00" differ due to ISI and distributed throughout a certain range, e.g. follow a distribution $DL_{D1}$ shown in FIG. 4.

As described above, even when the same data are repeatedly received, the levels of the actually received data vary within a certain range. That is, even when the same data are repeatedly received, the levels of the received data may be different from one another.

The threshold voltages $VTH_1$, $VTH_2$ and $VTH_3$ shown in FIG. 4 are used to determine the data value of the received signal. For example, when the data level of the received signal is higher than the threshold voltage $VTH_3$, the value is determined as "11". Therefore, in order to accurately determine the data value of the received signal, appropriate threshold voltages $VTH_1$, $VTH_2$ and $VTH_3$ are required.

For example, the threshold voltage $VTH_3$ may be calculated according to equation 1 below where $DL_4$ denotes any one data level following the distribution $DL_{D4}$ of data "11" shown in FIG. 4 and $DL_3$ denotes any one data level following the distribution $DL_{D3}$ of data "10".

$$V_{TH3} = \frac{DL_4 + DL_3}{2} \qquad \text{[Equation 1]}$$

Similarly, the threshold voltages $VTH_2$ and $VTH_1$ may be calculated according to equations 2 and 3 below, respectively, where $DL_2$ denotes any one data level following the distribution $DL_{D2}$ of data "01" and $DL_1$ denotes any one data level following the distribution $DL_{D1}$ of data "00".

$$V_{TH2} = \frac{DL_3 + DL_2}{2} \qquad \text{[Equation 2]}$$

$$V_{TH1} = \frac{DL_2 + DL_1}{2} \qquad \text{[Equation 3]}$$

That is, the threshold voltages $VTH_1$, $VTH_2$ and $VTH_3$ may be an average value of two data levels.

However, since the levels of the received data vary within a certain range even when the same data are received, the accuracy of data value determination varies depending on how the threshold voltages $VTH_1$, $VTH_2$ and $VTH_3$ are selected.

Hereinafter, the data levels of the received signal are denoted as $DL_1$, $DL_2$, $DL_3$, . . . and the threshold voltages that actually determine the data value of the received signal are denoted as $VTH_1$, $VTH_2$, $VTH_3$, . . . . A more detailed description are given in the following.

Figure 5:
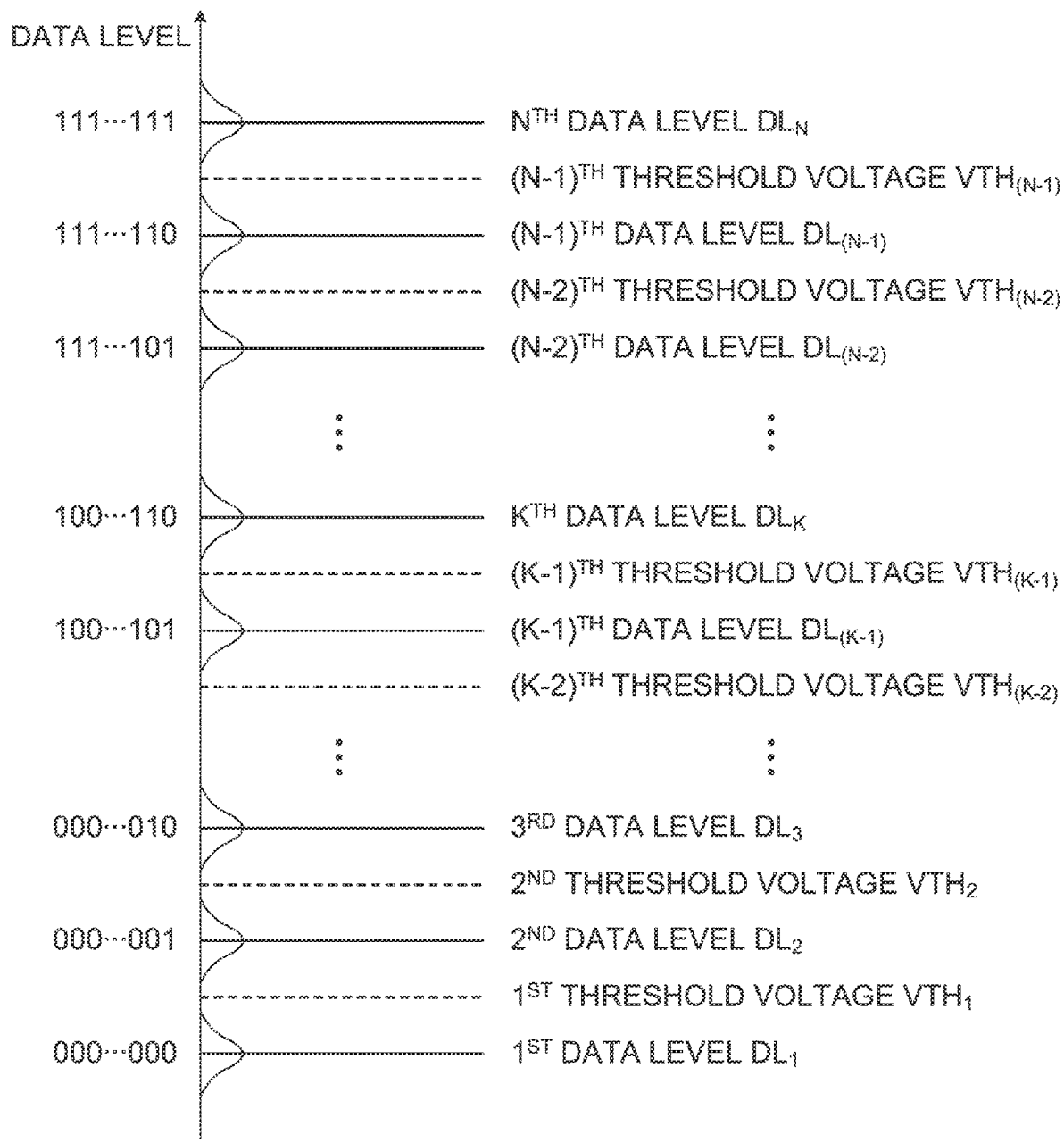
FIG. 5 is a diagram illustrating data level and distribution of a received PAM-N signal and threshold voltages.

First, as shown in FIG. 5, each of the levels of a plurality of data included in the signal received by the PAM-N receiver according to the present invention may be any one of N data levels. That is, the signal RS received by the PAM-N receiver includes the plurality of data, and the level of each data may be any one of a first data level $DL_1$ through an $N^{th}$ data level $DL_N$. For example, when data "000 . . . 000" is transmitted and received, the data level corresponding to the received data "000 . . . 000" is the first data level $DL_1$, and when data "111 . . . 111" is transmitted and received, the data level corresponding to the received data "111 . . . 111" is the $N^{th}$ data level $DL_N$. As described above, even when the plurality of data having the same value is repeatedly transmitted, the levels of the received data may differ from one another due to ISI. For example, when a plurality of data "111 . . . 111" is transmitted and received, the received data "111 . . . 111" have a data level of $N^{th}$ data level $DL_N$. However, the level of one received data "111 . . . 111" may differ from that of another received data "111 . . . 111" due to ISI. That is, the level of each received data may be an analog value within a certain range. Even when the received signal is equalized by the equalizer, the level of one equalized data "111 . . . 111" may differ from that of another equalized data "111 . . . 111". Therefore, each of the first data level $DL_1$ through the $N^{th}$ data level $DL_N$ means a certain range as shown in FIG. 4.

Herein, for example, "the level of the data is the first data level $DL_1$" means "the level of the data is a voltage within the distribution $DL_{D1}$". "The levels of one data and another data are the first data level $DL_1$" does not necessarily mean "The levels of one data and another data are the same" since the levels of one data and another data are referred to as the first data level $DL_1$ as long as the levels of one data and another data are both within the same range (distribution $DL_{D1}$) despite the difference in values due to ISI. That is, each of the first data level $DL_1$ through the $N^{th}$ data level $DL_N$ represents a range rather than a fixed value. For example, when a plurality of data "000 . . . 001" is transmitted and received, the level of each data "000 . . . 001" is "second data level $DL_2$" as long as the level of each data "000 . . . 001" is within a certain range (distribution $DL_{D2}$) shown in FIG. 4. However, the levels of the plurality of data "000 . . . 001" may differ from one another due to ISI.

Herein, in order to facilitate description, any one data level selected from the first data level $DL_1$ through the $N^{th}$ data level $DL_N$ is referred to as a $K^{th}$ data level $DL_K$. Here, N is a natural number equal to or greater than 2, and K is a natural number satisfying 1≤K≤N. In addition, the first data level $DL_1$ through the $N^{th}$ data level $DL_N$ satisfies $DL_1<DL_2<DL_3< . . . <DL_{(N-1)}<DL_N$.

In addition, FIG. 5 shows threshold voltages used to determine the data value from the data levels. The data level of the received signal (or equalized signal $EQ_{OUT}$) is compared with the threshold voltages, and the data value is determined according to the comparison result. For example, when the data level of the received signal is greater than $(N-1)^{th}$ threshold voltage $VTH_{(N-1)}$, the data value is determined as "111 . . . 111", and when the data level of the received signal is smaller than the $(N-1)^{th}$ threshold voltage $VTH_{(N-1)}$ but greater than the $(N-2)^{th}$ threshold voltage $VTH_{(N-2)}$, the data value is determined as "111 . . . 110".

Hereinafter, a PAM-N receiver according to the present invention capable of receiving a signal having data levels shown in FIG. 5 will be described in detail.

Figure 6:
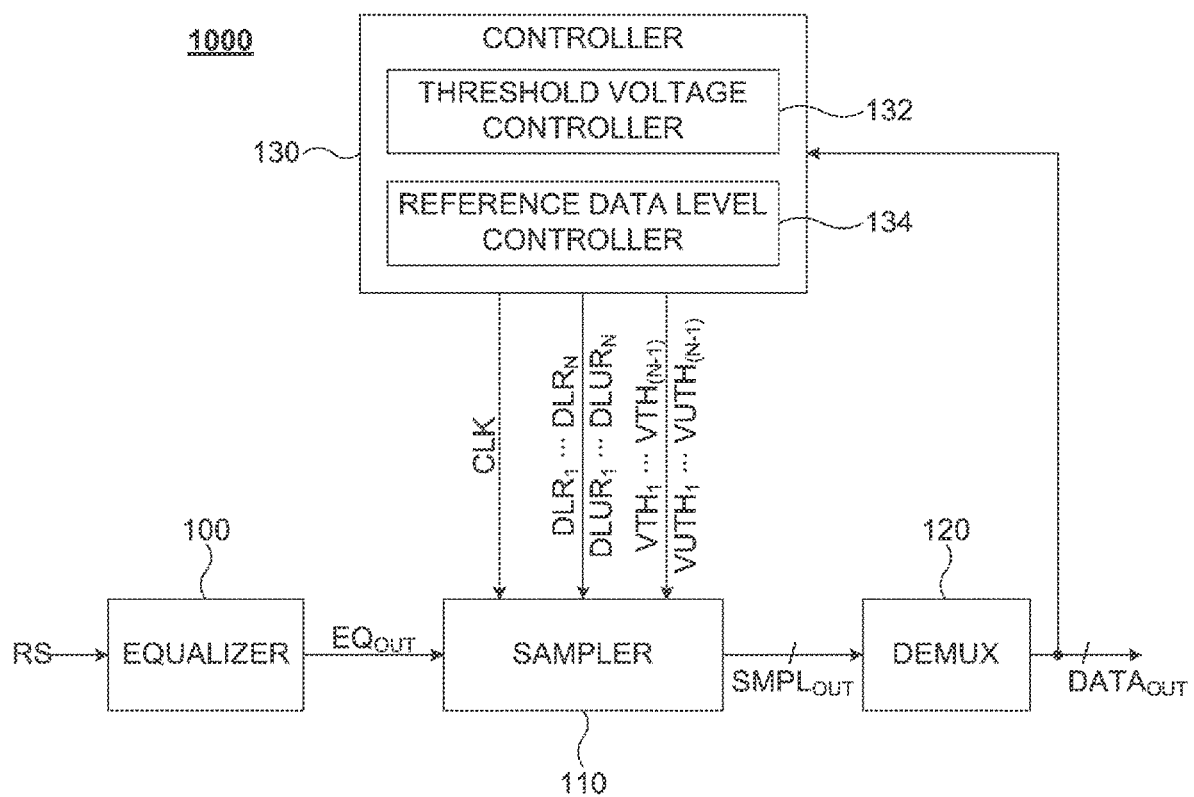
FIG. 6 is a block diagram illustrating a PAM-N receiver according to the present invention.

FIG. 6 is a block diagram illustrating a PAM-N receiver according to the present invention.

Referring to FIG. 6, a PAM-N receiver 1000 according to the present invention includes an equalizer 100, a sampler 110 and a DEMUX 120.

The equalizer 100 equalizes the received signal RS to generate an output signal $EQ_{OUT}$ having the first data level $DL_1$ through the $N^{th}$ data level $DL_N$.

Figure 1A:
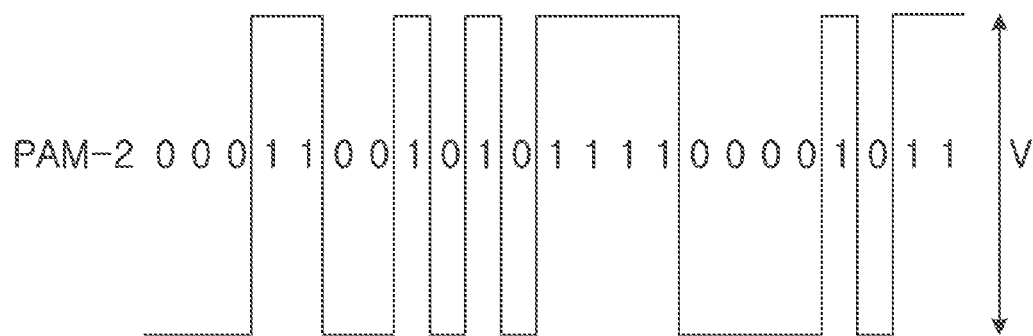
FIGS. 1A through 1D are diagrams illustrating binary PAM (PAM-2) and multi-level PAM (PAM-4, PAM-8 and PAM-N) signals, respectively.
Figure 1B:
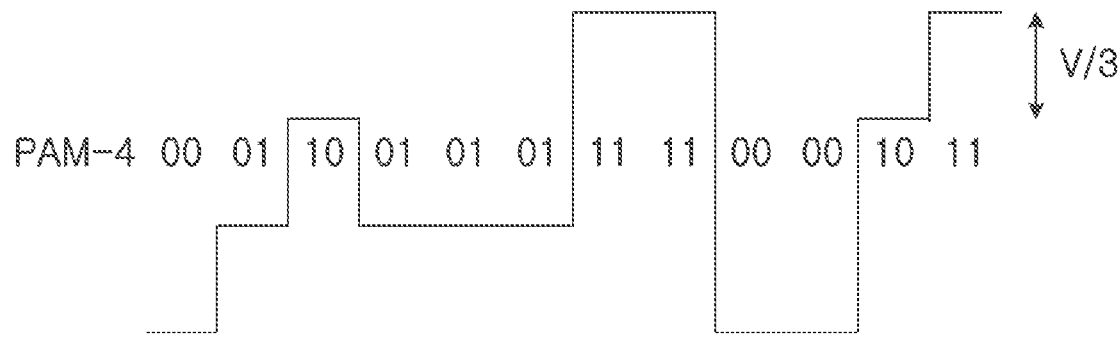
Figure 1C:
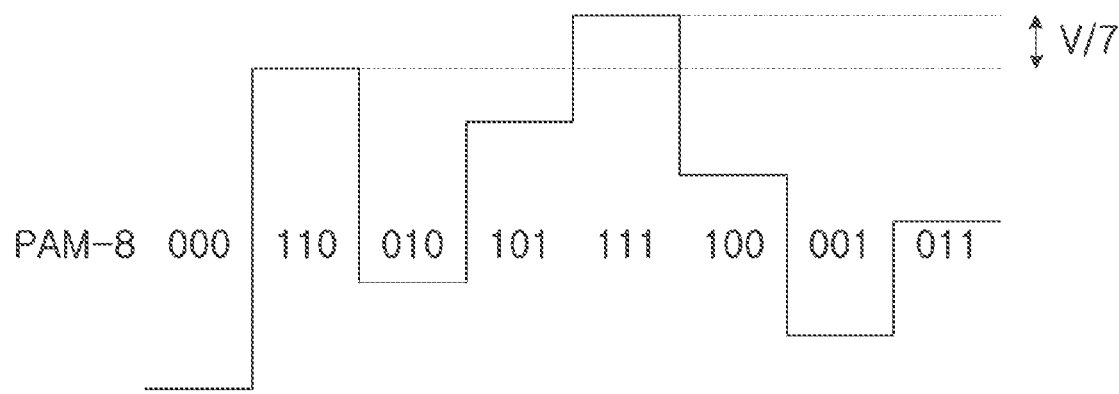
Figure 1D:
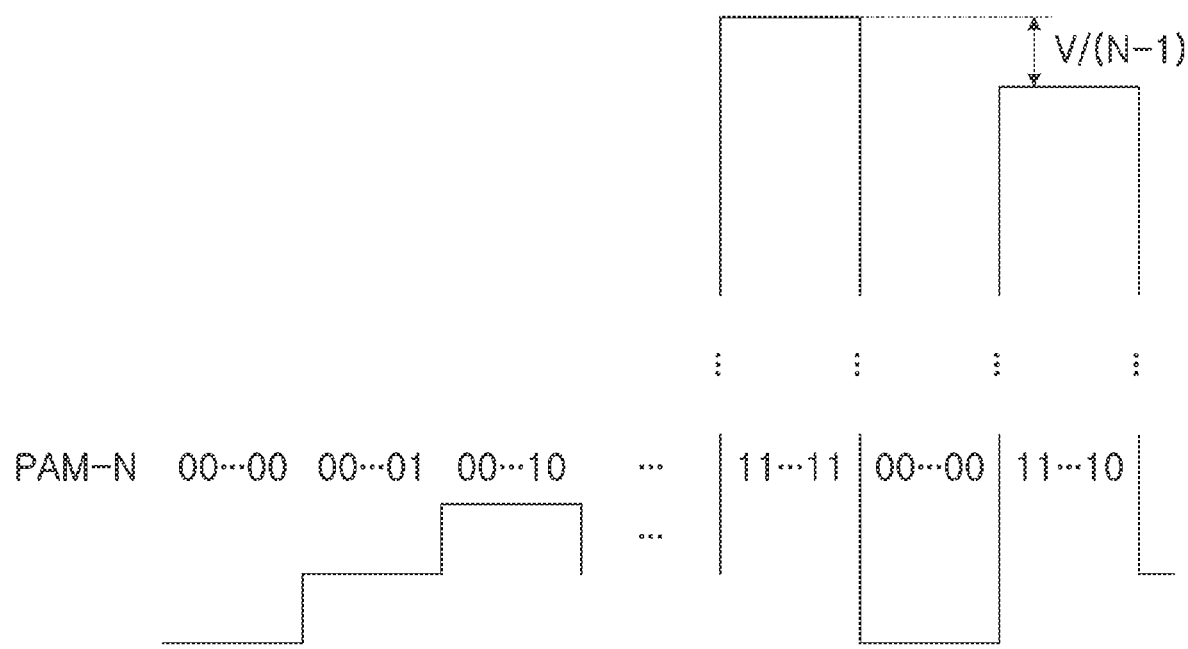
Figure 2:
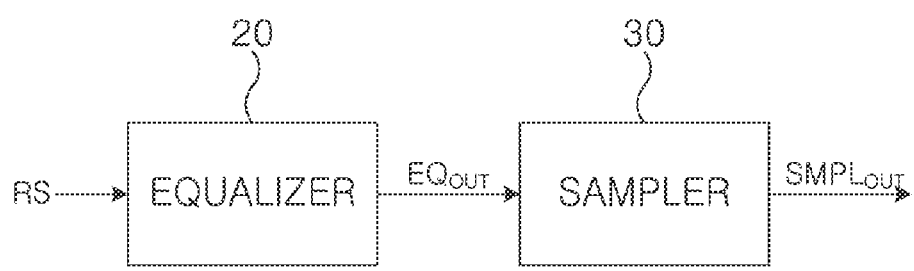
FIG. 2 is a block diagram illustrating an equalizer and a sampler of a conventional PAM-N receiver.
Figure 3A:
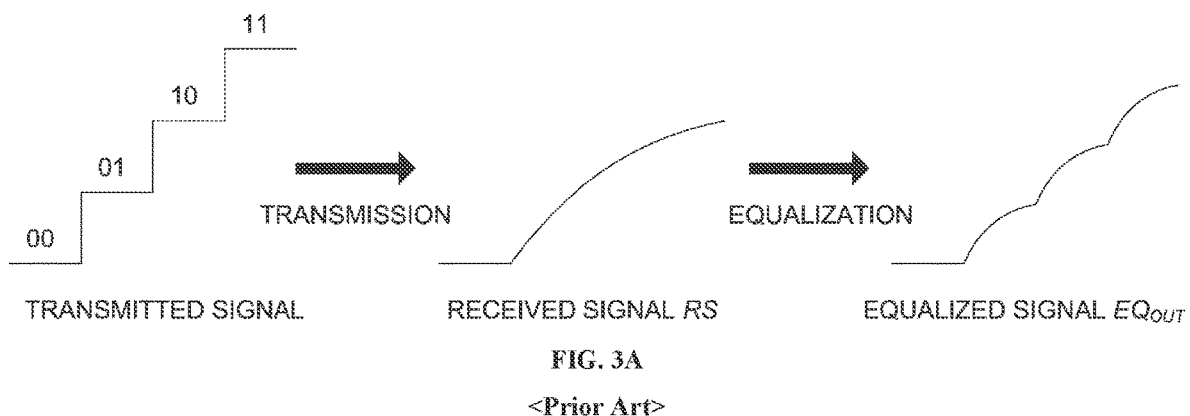
FIG. 3A is a diagram schematically illustrating a signal processing process of the conventional PAM-4 receiver 10 shown in FIG. 2.
Figure 3B:
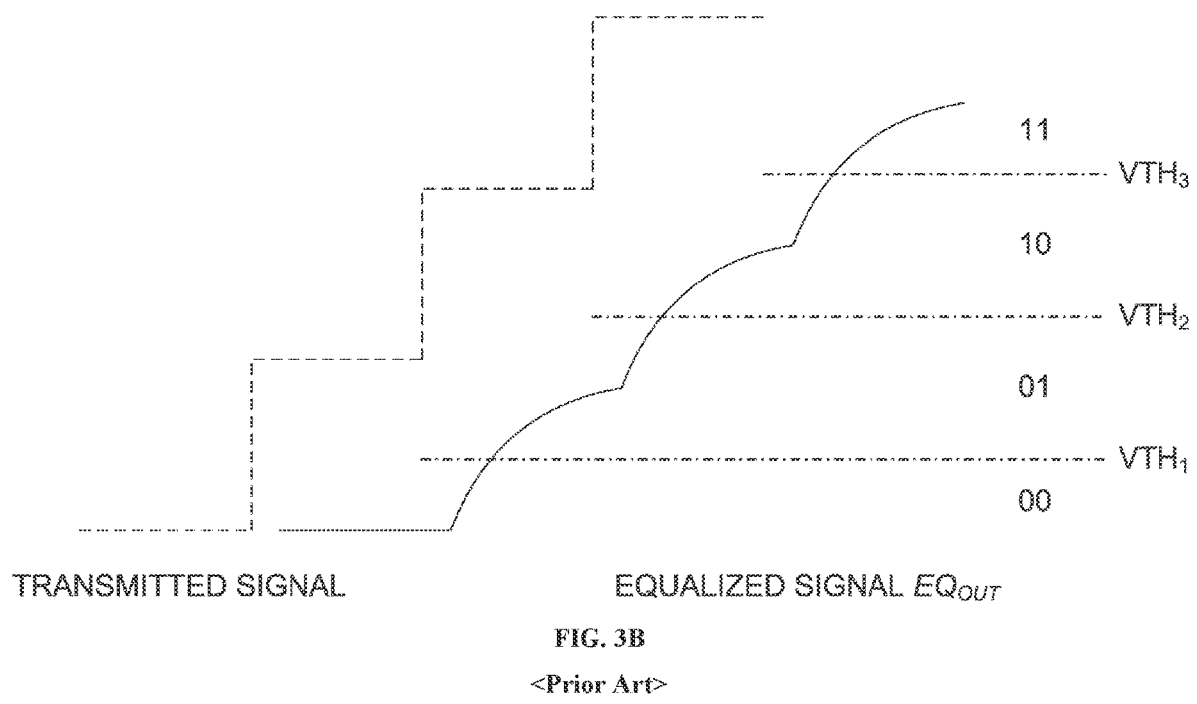
FIG. 3B is a diagram schematically illustrating a process for processing the signal $EQ_{OUT}$ by the sampler 30 of the conventional PAM-4 receiver 10 shown in FIG. 2.

Specifically, as shown in FIG. 3A or FIG. 3B, the equalized signal $EQ_{OUT}$ is generated by equalizing the received signal RS. The signal $EQ_{OUT}$ includes a plurality of data, and the level of each of plurality of data may be any one of the first data level $DL_1$ through the $N^{th}$ data level $DL_N$.

As described above, even the same transmitted data may have different data levels when received. For example, when the signal $EQ_{OUT}$ contains two received data both corresponding to data "111 . . . 111", the data levels of the first received data "111 . . . 111" and the second received data "111 . . . 111" may be different. However, when the level of the first received data "111 . . . 111" and the level of the second received data "111. . . . 111" are both in a certain range greater than the $(N-1)^{th}$ threshold voltage $VTH_{(N-1)}$, both the first received data and the second received data may be collectively referred to as having the $N^{th}$ data level $DL_N$.

That is, when the signal $EQ_{OUT}$ contains at least one data, each level of the at least one data included in the signal $EQ_{OUT}$ may is one of the first data level $DL_1$ through the $N^{th}$ data level $DL_N$.

The sampler 110 samples the output signal $EQ_{OUT}$ according to a first reference data level $DLR_1$ through an $N^{th}$ reference data level $DLR_N$ and the first threshold voltage $VTH_1$ to the $(N-1)^{th}$ threshold voltage $VTH_{(N-1)}$.

Specifically, the sampler 110 compares the level of each data included in the signal $EQ_{OUT}$ with the first reference data level $DLR_1$ through the $N^{th}$ reference data level $DLR_N$, and with the first threshold voltage $VTH_1$ through the $(N-1)^{th}$ threshold voltage $VTH_{(N-1)}$, and outputs an output signal $SMPL_{OUT}$ which represents the comparison result.

Here, the reference data levels are reference voltages used in the comparison with the level of the received signal (or the equalized signal $EQ_{OUT}$). As described above, the data levels of the received signal (or the equalized signal $EQ_{OUT}$) may differ from one another even for the same transmitted data. That is, due to factors affecting data transmission such as noise and/or ISI, even the data level for the same transmitted data may differ for each reception. Therefore, it is essential to select or adjust the threshold voltages reflecting the characteristics affecting data transmission and ISI in order to determine the data level accurately. In accordance with the present invention, predetermined reference data levels are first selected ("initial reference data levels") and the threshold voltages appropriate for determining the level of the received signal (or equalized signal $EQ_{OUT}$) are then calculated by increasing or decreasing the reference data level depending on which one of the level of the received signal (or equalized signal $EQ_{OUT}$) and the reference data level is greater. While the initial reference data levels maybe arbitrarily selected, it is preferable that the average value of the initial threshold voltage be set as the initial reference data level. For example, in FIG. 5, the average of the $(N-1)^{th}$ threshold voltage $VTH_{(N-1)}$ and the $(N-2)^{th}$ threshold voltage $VTH_{(N-2)}$ may be selected as a reference data level $DLR_{(N-1)}$. Alternatively, a data level corresponding to an average value (a data level that occurs most frequently) in the distribution of the received signal (or equalized signal $EQ_{OUT}$) may be selected as the reference data level. Regardless of how the initial reference data levels are chosen, the threshold voltages eventually converge to optimal values as data are received since the reference data level is increased or decreased according to the level of the received signal.

The DEMUX 120 parallelizes the output signal $SMPL_{OUT}$ of the sampler 110 and outputs parallelized signal as signal $DATA_{OUT}$. That is, the output signal $SMPL_{OUT}$ is de-serialized and provided to the controller 130 as the signal $DATA_{OUT}$.

Hereinafter, the sampler 110 will be described in detail with reference to FIGS. 7A and 7B.

Figure 7A:
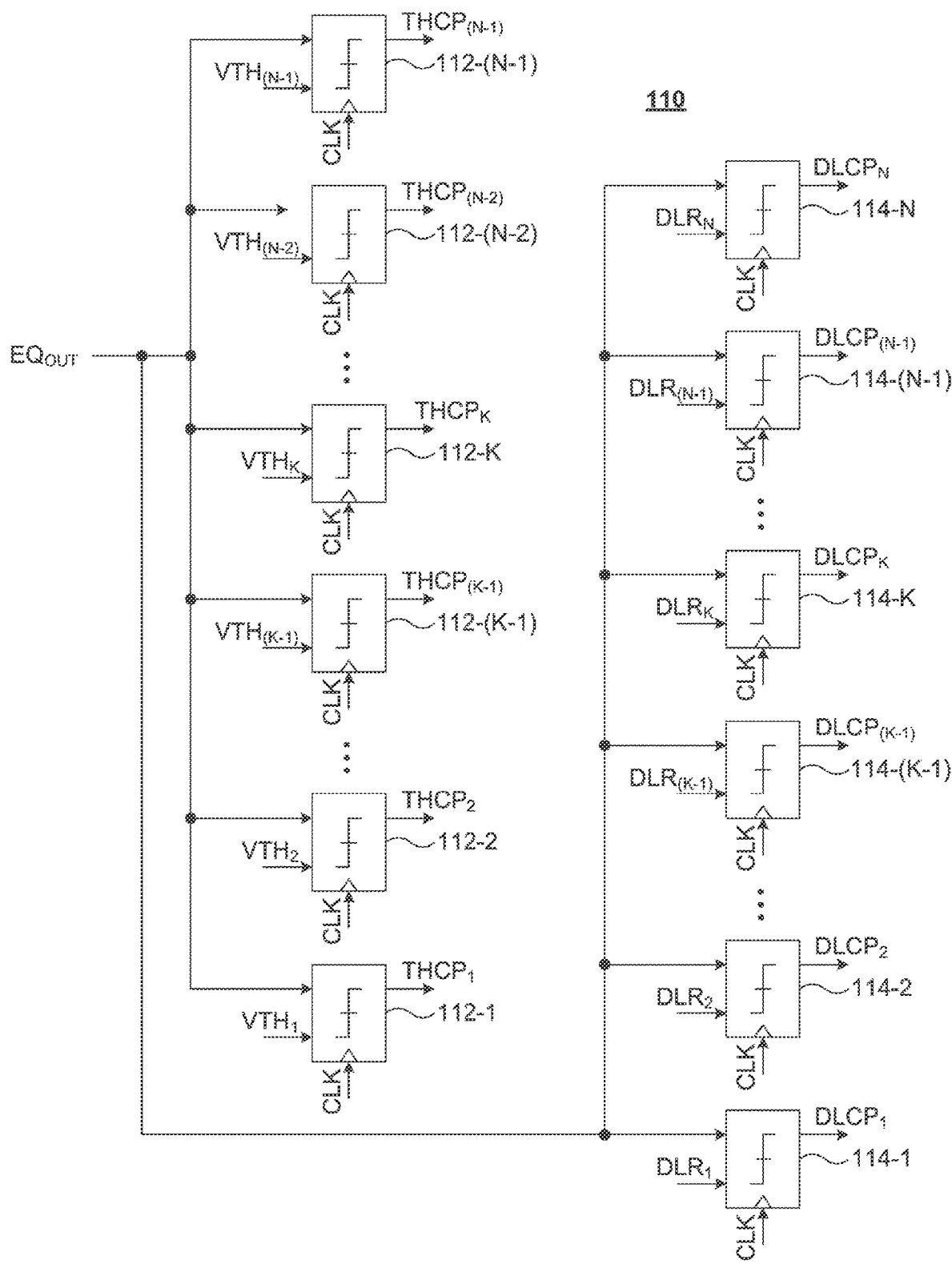
FIGS. 7A and 7B are block diagrams illustrating a sampler of a PAM-N receiver according to the present invention.

FIG. 7A is a block diagram illustrating the sampler 110 including a plurality of comparators.

Referring to FIG. 7A, the sampler 110 includes first threshold voltage comparator 112-1 through $(N-1)^{th}$ threshold voltage comparator 112-(N-1) and first data level comparator 114-1 through $N^{th}$ data level comparator 114-N (where N is a natural number).

The first threshold voltage comparator 112-1 through the $(N-1)^{th}$ threshold voltage comparator 112-(N-1) compare the level of each data included in the signal $EQ_{OUT}$ with the first threshold voltage $VTH_1$ to the $(N-1)^{th}$ threshold voltage $VTH_{(N-1)}$, and output the comparison result.

For example, the first threshold voltage comparator 112-1 compares the signal $EQ_{OUT}$ with the first threshold voltage $VTH_1$ for each clock CLK and outputs a signal $THCP_1$ representing a comparison result. That is, the first threshold voltage comparator 112-1 outputs $THCP_1=1$ for each data when the level of the data included in the signal $EQ_{OUT}$ is greater than the first threshold voltage $VTH_1$, and outputs $THCP_1=0$ for each data when the level of the data included in the signal $EQ_{OUT}$ is smaller than the first threshold voltage $VTH_1$.

The second threshold voltage comparator 112-2 compares the signal $EQ_{OUT}$ with the second threshold voltage $VTH_2$ for each clock CLK and outputs a signal $THCP_2$ representing a comparison result. That is, the second threshold voltage comparator 112-2 outputs $THCP_2=1$ for each data when the level of the data included in the signal $EQ_{OUT}$ is greater than the second threshold voltage $VTH_2$, and outputs $THCP_2=0$ for each data when the level of the data included in the signal $EQ_{OUT}$ is smaller than the second threshold voltage $VTH_2$.

Similarly, the $(N-2)^{th}$ threshold voltage comparator 112-(N-2) compares the signal $EQ_{OUT}$ with the $(N-2)^{th}$ threshold voltage $VTH_{(N-2)}$ for each clock CLK and outputs a signal $THCP_{(N-2)}$ representing a comparison result. That is, the $(N-2)^{th}$ threshold voltage comparator 112-(N-2) outputs $THCP_{(N-2)}=1$ for each data when the level of the data included in the signal $EQ_{OUT}$ is greater than the $(N-2)^{th}$ threshold voltage $VTH_{(N-2)}$, and outputs $THCP_{(N-2)}=0$ for each data when the level of the data included in the signal $EQ_{OUT}$ is smaller than the $(N-2)^{th}$ threshold voltage $VTH_{(N-2)}$.

Similarly, the $(N-1)^{th}$ threshold voltage comparator 112-(N-1) compares the signal $EQ_{OUT}$ with the $(N-1)^{th}$ threshold voltage $VTH_{(N-1)}$ for each clock CLK and outputs a signal $THCP_{(N-1)}$ representing a comparison result. That is, the $(N-1)^{th}$ threshold voltage comparator 112-(N-1) outputs $THCP_{(N-1)}=1$ for each data when the level of the data included in the signal $EQ_{OUT}$ is greater than the $(N-1)^{th}$ threshold voltage $VTH_{(N-1)}$, and outputs $THCP_{(N-1)}=0$ for each data when the level of the data included in the signal $EQ_{OUT}$ is smaller than the $(N-1)^{th}$ threshold voltage $VTH_{(N-1)}$.

A $K^{th}$ threshold voltage comparator 112-K (where "$K^{th}$ threshold voltage comparator 112-K" represents any one of the first threshold voltage comparator 112-1 through the $(N-1)^{th}$ threshold voltage comparator 112-(N-1)) outputs a signal $THCP_K$ representing a comparison result obtained by comparing the signal $EQ_{OUT}$ with the $K^{th}$ threshold voltage $VTH_K$ for each clock CLK. Specifically, the $K^{th}$ threshold voltage comparator 112-K outputs $THCP_K=1$ when the level of the data included in the signal $EQ_{OUT}$ is greater than the $K^{th}$ threshold voltage $VTH_K$, and outputs $THCP_K=0$ when the level of the data included in the signal $EQ_{OUT}$ is smaller than the $K^{th}$ threshold voltage $VTH_K$.

A $(K-1)^{th}$ threshold voltage comparator 112-(K-1), which is adjacent to the $K^{th}$ threshold voltage comparator 112-K, outputs a signal $THCP_{(K-1)}$ representing a comparison result obtained by comparing the signal $EQ_{OUT}$ with the $(K-1)^{th}$ threshold voltage $VTH_{(K-1)}$ for each clock CLK. Specifically, the $(K-1)^{th}$ threshold voltage comparator 112-(K-1) outputs $THCP_{(K-1)}=1$ when the level of the data included in the signal $EQ_{OUT}$ is greater than the $(K-1)^{th}$ threshold voltage $VTH_{(K-1)}$, and outputs $THCP_{(K-1)}=0$ when the level of the data included in the signal $EQ_{OUT}$ is smaller than the $(K-1)^{th}$ threshold voltage $VTH_{(K-1)}$.

Here, K is a natural number satisfying $1 \leq K \leq (N-1)$, and $VTH_1, VTH_2, VTH_3, \ldots, VTH_{(N-2)}$ and $VTH_{(N-1)}$ satisfy $VTH_1 < VTH_2 < VTH_3 < \ldots < VTH_{(N-2)} < VTH_{(N-1)}$.

The level of the data contained in the signal $EQ_{OUT}$ is determined from the signal $THCP_1$ through the signal $THCP_{(N-1)}$ outputted by the first threshold voltage comparator 112-1 through the $(N-1)^{th}$ threshold voltage comparator 112-(N-1), respectively. For example, when the signal $THCP_1$ through the signal $THCP_{(N-1)}$ outputted by the first threshold voltage comparator 112-1 through the $(N-1)^{th}$ threshold voltage comparator 112-(N-1), respectively, are all "1", the level of the data included in the signal $EQ_{OUT}$ is determined as the $N^{th}$ data level $DL_N$, and when the signal $THCP_1$ through the signal $THCP_{(N-1)}$ outputted by the first threshold voltage comparator 112-1 through the $(N-1)^{th}$ threshold voltage comparator 112-(N-1), respectively, are all "0", the level of the data included in the signal $EQ_{OUT}$ is determined as the first data level $DL_1$.

This may be applied to the $(K-1)^{th}$ threshold voltage comparator 112-(K-1). For example, when the signal $THCP_1$ through the signal $THCP_{(K-1)}$ outputted by the first threshold voltage comparator 112-1 through the $(K-1)^{th}$ threshold voltage comparator 112-(K-1), respectively, are all "1", and the signal $THCP_K$ through the signal $THCP_{(N-1)}$ outputted by the $K^{th}$ threshold voltage comparator 112-K through the $(N-1)^{th}$ threshold voltage comparator 112-(N-1), respectively, are all "0", the level of the data included in the signal $EQ_{OUT}$ is determined as the $K^{th}$ data level $DL_K$. That is, when $THCP_1 = THCP_2 = \ldots = THCP_{(K-1)} = 1$ and, $THCP_K = THCP_{(K+1)} = \ldots = THCP_{(N-1)} = 0$, the level of the data included in the signal $EQ_{OUT}$ is the $K^{th}$ data level $DL_K$. Therefore, the level of the data included in the signal $EQ_{OUT}$ may be determined by checking the values outputted by the first threshold voltage comparator 112-1 through the $(N-1)^{th}$ threshold voltage comparator 112-(N-1).

The first data level comparator 114-1 through the $N^{th}$ data level comparator 114-N compare the level of the data included in the signal $EQ_{OUT}$ with the first reference data level $DLR_1$ through the $N^{th}$ reference data level $DLR_N$, respectively, and output the comparison result thereof.

For example, the first data level comparator 114-1 compares the signal $EQ_{OUT}$ with the first reference data level $DLR_1$ for each clock CLK, and outputs a signal $DLCP_1$ representing the comparison result. Specifically, the first data level comparator 114-1 outputs $DLCP_1=1$ when the level of the data included in the signal $EQ_{OUT}$ is greater than the first reference data level $DLR_1$, and outputs $DLCP_1=0$ when the level of the data included in the signal $EQ_{OUT}$ is smaller than the first reference data level $DLR_1$.

The second data level comparator 114-2 compares the signal $EQ_{OUT}$ with the second reference data level $DLR_2$ for each clock CLK, and outputs a signal $DLCP_2$ representing the comparison result. Specifically, the second data level comparator 114-2 outputs $DLCP_2=1$ when the level of the data included in the signal $EQ_{OUT}$ is greater than the second reference data level $DLR_2$, and outputs $DLCP_2=0$ when the level of the data included in the signal $EQ_{OUT}$ is smaller than the second reference data level $DLR_2$.

The $(N-1)^{th}$ data level comparator 114-(N-1) compares the signal $EQ_{OUT}$ with the $(N-1)^{th}$ reference data level $DLR_{(N-1)}$ for each clock CLK, and outputs a signal $DLCP_{(N-1)}$ representing the comparison result. Specifically, the $(N-1)^{th}$ data level comparator 114-(N-1) outputs $DLCP_{(N-1)}=1$ when the level of the data included in the signal $EQ_{OUT}$ is greater than the $(N-1)^{th}$ reference data level $DLR_{(N-1)}$, and outputs $DLCP_{(N-1)}=0$ when the level of the data included in the signal $EQ_{OUT}$ is smaller than the $(N-1)^{th}$ reference data level $DLR_{(N-1)}$.

The $N^{th}$ data level comparator 114-N compares the signal $EQ_{OUT}$ with the $N^{th}$ reference data level $DLR_N$ for each clock CLK, and outputs a signal $DLCP_N$ representing the comparison result. Specifically, the $N^{th}$ data level comparator 114-N outputs $DLCP_N=1$ when the level of the data included in the signal $EQ_{OUT}$ is greater than the $N^{th}$ reference data level $DLR_N$, and outputs $DLCP_N=0$ when the level of the data included in the signal $EQ_{OUT}$ is smaller than the $N^{th}$ reference data level $DLR_N$.

A $K^{th}$ data level comparator 114-K (where "$K^{th}$ data level comparator 114-K" represents any one of the first data level comparator 114-1 through the $N^{th}$ data level comparator 114-N) outputs a signal $DLCP_K$ representing a comparison result obtained by comparing the signal $EQ_{OUT}$ with the $K^{th}$ reference data level $DLR_K$ for each clock CLK. Specifically, the $K^{th}$ data level comparator 114-K outputs $DLCP_K=1$ when the level of the data included in the signal $EQ_{OUT}$ is greater than the $K^{th}$ reference data level $DLR_K$, and outputs $DLCP_K=0$ when the level of the data included in the signal $EQ_{OUT}$ is smaller than the $K^{th}$ reference data level $DLR_K$.

A $(K-1)^{th}$ data level comparator 114-(K-1), which is adjacent to the $K^{th}$ data level comparator 114-K, outputs a signal $DLCP_{(K-1)}$ representing a comparison result obtained by comparing the signal $EQ_{OUT}$ with the $(K-1)^{th}$ reference data level $DLR_{(K-1)}$ for each clock CLK. Specifically, the $(K-1)^{th}$ data level comparator 114-(K-1) outputs $DLCP_{(K-1)}=1$ when the level of the data included in the signal $EQ_{OUT}$ is greater than the $(K-1)^{th}$ reference data level $DLR_{(K-1)}$, and outputs $DLCP_{(K-1)}=0$ when the level of the data included in the signal $EQ_{OUT}$ is smaller than the $(K-1)^{th}$ reference data level $DLR_{(K-1)}$.

Here, K is a natural number satisfying 1≤K≤N, and $DLR_1$, $DLR_2$, $DLR_3$, ..., $DLR_{(N-1)}$, and $DLR_N$ satisfy $DLR_1<DLR_2<DLR_3< ... <DLR_{(N-1)}<DLR_N$. In other words, each of the first data level comparator 114-1 through the $N^{th}$ data level comparator 114-N compare the level of the data included in the signal $EQ_{OUT}$ with the corresponding reference data level thereof.

The signal $DLCP_1$ through the signal $DLCP_N$ outputted by the first data level comparator 114-1 through the $N^{th}$ data level comparator 114-N, respectively, are used to determined which one of the level of the data included in the signal $EQ_{OUT}$ and the reference data level is greater. For example, when the data included in the signal $EQ_{OUT}$ is determined to have a level of the $N^{th}$ data level $DL_N$ by the first threshold voltage comparator 112-1 through the $(N-1)^{th}$ threshold voltage comparator 112-(N-1), and the signal $DLCP_N$ outputted by the $N^{th}$ data level comparator 114-N is "1", the level of the data included in the signal $EQ_{OUT}$ is deduced or determined to be greater than the $N^{th}$ reference data level $DLR_N$. Similarly, when the data included in the signal $EQ_{OUT}$ is determined to have a level of the first data level $DL_1$ by the first threshold voltage comparator 112-1 through the $(N-1)^{th}$ threshold voltage comparator 112-(N-1), and the signal $DLCP_1$ outputted by the first data level comparator 114-1 is "0", the level of the data included in the signal $EQ_{OUT}$ is deduced or determined to be smaller than the first reference data level $DLR_1$.

This may be applied to the $K^{th}$ data level comparator 114-K as follows.

When the data included in the signal $EQ_{OUT}$ is determined to have a level of the $K^{th}$ data level $DL_K$ by the first threshold voltage comparator 112-1 through the $(N-1)^{th}$ threshold voltage comparator 112-(N-1), and the signal $DLCP_K$ outputted by the $K^{th}$ data level comparator 114-K is "1", the level of the data included in the signal $EQ_{OUT}$ is deduced or determined to be greater than the $K^{th}$ reference data level $DLR_K$.

In addition, when the data included in the signal $EQ_{OUT}$ is determined to have a level of the $K^{th}$ data level $DL_K$ by the first threshold voltage comparator 112-1 through the $(N-1)^{th}$ threshold voltage comparator 112-(N-1), and the signal $DLCP_K$ outputted by the $K^{th}$ data level comparator 114-K is "0", the level of the data included in the signal $EQ_{OUT}$ is deduced or determined to be smaller than the $K^{th}$ reference data level $DLR_K$.

The sampler 110 outputs an output signal $SMPL_{OUT}$ which contains the signal $THCP_1$ through the signal $THCP_{(N-1)}$ outputted by the first threshold voltage comparator 112-1 through the $(N-1)^{th}$ threshold voltage comparator 112-(N-1), respectively, and the signal $DLCP_1$ through the signal $DLCP_N$ outputted by the first data level comparator 114-1 through the $N^{th}$ data level comparator 114-N, respectively.

The output signal $SMPL_{OUT}$ is transmitted to the controller 130 via the DEMUX 120 as a signal $DATA_{OUT}$.

Figure 7B:
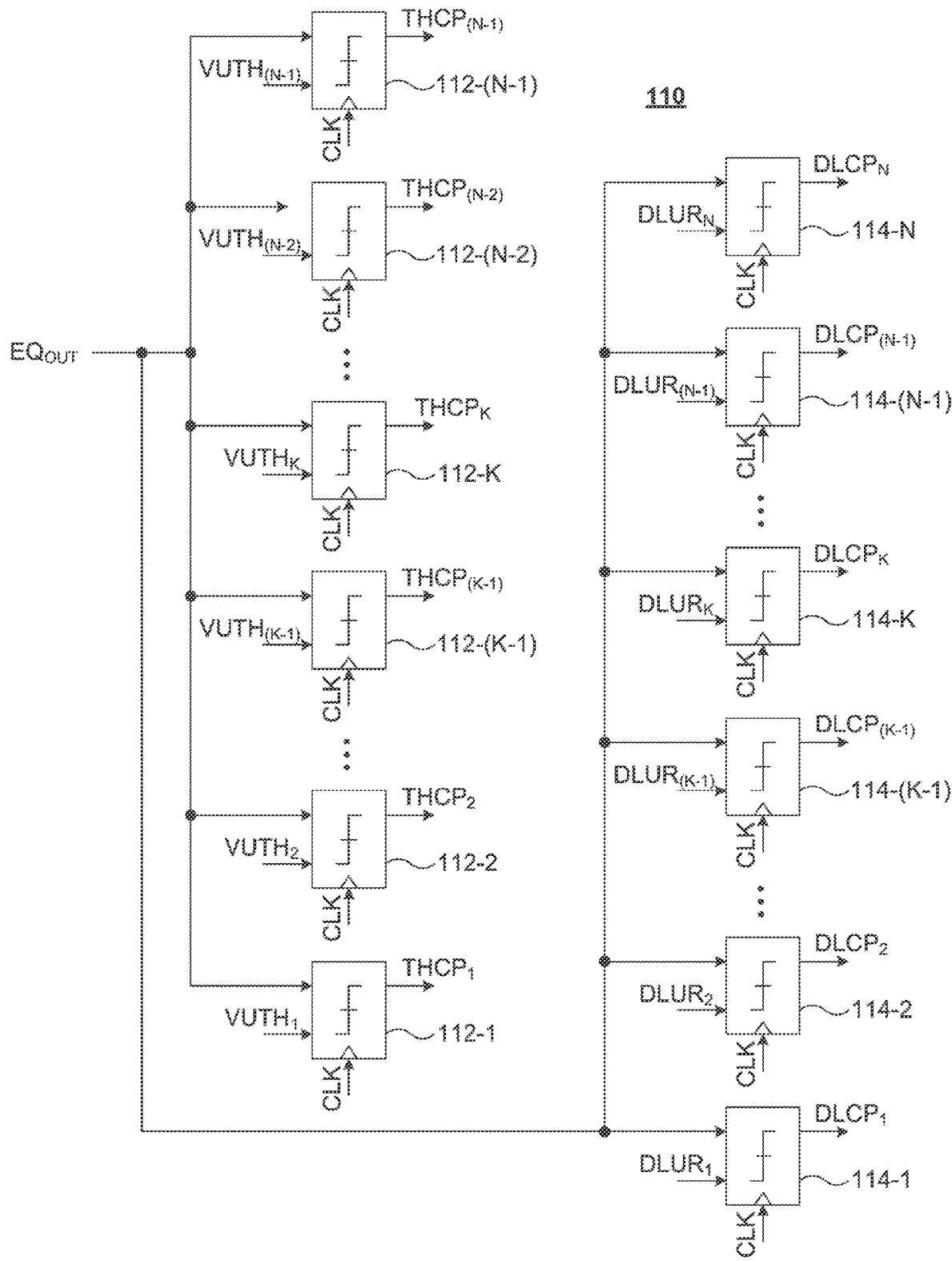

FIG. 7B is a block diagram illustrating the sampler 110 including a plurality of comparators wherein an updated threshold voltage and an updated reference data level are applied to the plurality of comparators illustrated in FIG. 7A is exemplified.

Referring to FIG. 7B, the first threshold voltage comparator 112-1 through the $(N-1)^{th}$ threshold voltage comparator 112-(N-1) compare the level of the data included in the signal $EQ_{OUT}$ with an first updated threshold voltage $VUTH_1$ through an $(N-1)^{th}$ updated threshold voltage $VUTH_{(N-1)}$, and output the comparison result.

For example, the first threshold voltage comparator 112-1 compares the signal $EQ_{OUT}$ with the first updated threshold voltage $VUTH_1$ for each clock CLK and outputs a signal $THCP_1$ representing a comparison result. That is, the first threshold voltage comparator 112-1 outputs $THCP_1=1$ for each data when the level of the data included in the signal $EQ_{OUT}$ is greater than the first updated threshold voltage $VUTH_1$, and outputs $THCP_1=0$ for each data when the level of the data included in the signal $EQ_{OUT}$ is smaller than the first updated threshold voltage $VUTH_1$.

The second threshold voltage comparator 112-2 compares the signal $EQ_{OUT}$ with the second updated threshold voltage $VUTH_2$ for each clock CLK and outputs a signal $THCP_2$ representing a comparison result. That is, the second threshold voltage comparator 112-2 outputs $THCP_2=1$ for each data when the level of the data included in the signal $EQ_{OUT}$ is greater than the second updated threshold voltage $VUTH_2$, and outputs $THCP_2=0$ for each data when the level of the data included in the signal $EQ_{OUT}$ is smaller than the second updated threshold voltage $VUTH_2$.

The $(N-2)^{th}$ threshold voltage comparator 112-(N-2) compares the signal $EQ_{OUT}$ with the $(N-2)^{th}$ updated threshold voltage $VUTH_{(N-2)}$ for each clock CLK and outputs a signal $THCP_{(N-2)}$ representing a comparison result. That is, the $(N-2)^{th}$ threshold voltage comparator 112-(N-2) outputs $THCP_{(N-2)}=1$ for each data when the level of the data included in the signal $EQ_{OUT}$ is greater than the $(N-2)^{th}$ updated threshold voltage $VUTH_{(N-2)}$, and outputs $THCP_{(N-2)}=0$ for each data when the level of the data included in the signal $EQ_{OUT}$ is smaller than the $(N-2)^{th}$ updated threshold voltage $VUTH_{(N-2)}$.

Similarly, the $(N-1)^{th}$ threshold voltage comparator 112-(N-1) compares the signal $EQ_{OUT}$ with the $(N-1)^{th}$ updated threshold voltage $VUTH_{(N-1)}$ for each clock CLK and outputs a signal $THCP_{(N-1)}$ representing a comparison result. That is, the $(N-1)^{th}$ threshold voltage comparator 112-(N-1) outputs $THCP_{(N-1)}=1$ for each data when the level of the data included in the signal $EQ_{OUT}$ is greater than the $(N-1)^{th}$ updated threshold voltage $VUTH_{(N-1)}$, and outputs $THCP_{(N-1)}=0$ for each data when the level of the data included in the signal $EQ_{OUT}$ is smaller than the $(N-1)^{th}$ updated threshold voltage $VUTH_{(N-1)}$.

The $K^{th}$ threshold voltage comparator 112-K (where "$K^{th}$ threshold voltage comparator 112-K" represents any one of the first threshold voltage comparator 112-1 through the $(N-1)^{th}$ threshold voltage comparator 112-(N-1)) outputs a signal $THCP_K$ representing a comparison result obtained by comparing the signal $EQ_{OUT}$ with the $K^{th}$ updated threshold voltage $VUTH_K$ for each clock CLK. Specifically, the $K^{th}$ threshold voltage comparator 112-K outputs $THCP_K=1$ when the level of the data included in the signal $EQ_{OUT}$ is greater than the $K^{th}$ updated threshold voltage $VUTH_K$, and outputs $THCP_K=0$ when the level of the data included in the signal $EQ_{OUT}$ is smaller than the $K^{th}$ updated threshold voltage $VUTH_K$.

The $(K-1)^{th}$ threshold voltage comparator 112-(K-1), which is adjacent to the $K^{th}$ threshold voltage comparator 112-K, outputs a signal $THCP_{(K-1)}$ representing a comparison result obtained by comparing the signal $EQ_{OUT}$ with the $(K-1)^{th}$ updated threshold voltage $VUTH_{(K-1)}$ for each clock CLK. Specifically, the $(K-1)^{th}$ threshold voltage comparator 112-(K-1) outputs $THCP_{(K-1)}=1$ when the level of the data included in the signal $EQ_{OUT}$ is greater than the $(K-1)^{th}$ updated threshold voltage $VUTH_{(K-1)}$, and outputs $THCP_{(K-1)}=0$ when the level of the data included in the signal $EQ_{OUT}$ is smaller than the $(K-1)^{th}$ updated threshold voltage $VUTH_{(K-1)}$.

Here, K is a natural number satisfying $1 \leq K \leq (N-1)$, and $VTH_1, VTH_2, VTH_3, \ldots, VTH_{(N-2)}$ and $VTH_{(N-1)}$ satisfy $VTH_1 < VTH_2 < VTH_3 < \ldots < VTH_{(N-2)} < VTH_{(N-1)}$.

The level of the data contained in the signal $EQ_{OUT}$ is determined from the signal $THCP_1$ through the signal $THCP_{(N-1)}$ outputted by the first threshold voltage comparator 112-1 through the $(N-1)^{th}$ threshold voltage comparator 112-(N-1), respectively. For example, when the signal $THCP_1$ through the signal $THCP_{(N-1)}$ outputted by the first threshold voltage comparator 112-1 through the $(N-1)^{th}$ threshold voltage comparator 112-(N-1), respectively, are all "1", the level of the data included in the signal $EQ_{OUT}$ is determined as the $N^{th}$ data level $DL_N$, and when the signal $THCP_1$ through the signal $THCP_{(N-1)}$ outputted by the first threshold voltage comparator 112-1 through the $(N-1)^{th}$ threshold voltage comparator 112-(N-1), respectively, are all "0", the level of the data included in the signal $EQ_{OUT}$ is determined as the first data level $DL_1$.

This may be applied to the $(K-1)^{th}$ threshold voltage comparator 112-(K-1). For example, when the signal $THCP_1$ through the signal $THCP_{(K-1)}$ outputted by the first threshold voltage comparator 112-1 through the $(K-1)^{th}$ threshold voltage comparator 112-(K-1), respectively, are all "1", and the signal $THCP_K$ through the signal $THCP_{(N-1)}$ outputted by the $K^{th}$ threshold voltage comparator 112-K through the $(N-1)^{th}$ threshold voltage comparator 112-(N-1), respectively, are all "0", the level of the data included in the signal $EQ_{OUT}$ is determined as the $K^{th}$ data level $DL_K$. That is, when $THCP_1 = THCP_2 = \ldots = THCP_{(K-1)} = 1$ and, $THCP_K = THCP_{(K+1)} = \ldots = THCP_{(N-1)} = 0$, the level of the data included in the signal $EQ_{OUT}$ is the $K^{th}$ data level $DL_K$. Therefore, the level of the data included in the signal $EQ_{OUT}$ may be determined by checking the values outputted by the first threshold voltage comparator 112-1 through the $(N-1)^{th}$ threshold voltage comparator 112-(N-1).

The first data level comparator 114-1 through the $N^{th}$ data level comparator 114-N compare the level of the data included in the signal $EQ_{OUT}$ with the first updated reference data level $DLUR_1$ through the $N^{th}$ updated reference data level $DLUR_N$, respectively, and output the comparison result thereof.

For example, the first data level comparator 114-1 compares the signal $EQ_{OUT}$ with the first updated reference data level $DLUR_1$ for each clock CLK, and outputs a signal $DLCP_1$ representing the comparison result. Specifically, the first data level comparator 114-1 outputs $DLCP_1=1$ when the level of the data included in the signal $EQ_{OUT}$ is greater than the first updated reference data level $DLUR_1$, and outputs $DLCP_1=0$ when the level of the data included in the signal $EQ_{OUT}$ is smaller than the first updated reference data level $DLUR_1$.

The second data level comparator 114-2 compares the signal $EQ_{OUT}$ with the second updated reference data level $DLUR_2$ for each clock CLK, and outputs a signal $DLCP_2$ representing the comparison result. Specifically, the second data level comparator 114-2 outputs $DLCP_2=1$ when the level of the data included in the signal $EQ_{OUT}$ is greater than the second updated reference data level $DLUR_2$, and outputs $DLCP_2=0$ when the level of the data included in the signal $EQ_{OUT}$ is smaller than the second updated reference data level $DLUR_2$.

The $(N-1)^{th}$ data level comparator 114-(N-1) compares the signal $EQ_{OUT}$ with the $(N-1)^{th}$ updated reference data level DLUR(N-I) for each clock CLK, and outputs a signal $DLCP_{(N-1)}$ representing the comparison result. Specifically, the $(N-1)^{th}$ data level comparator 114-(N-1) outputs $DLCP_{(N-1)}=1$ when the level of the data included in the signal $EQ_{OUT}$ is greater than the $(N-1)^{th}$ updated reference data level $DLUR_{(N-1)}$, and outputs $DLCP_{(N-1)}=0$ when the level of the data included in the signal $EQ_{OUT}$ is smaller than the $(N-1)^{th}$ updated reference data level $DLUR_{(N-1)}$.

The $N^{th}$ data level comparator 114-N compares the signal $EQ_{OUT}$ with the $N^{th}$ updated reference data level $DLUR_N$ for each clock CLK, and outputs a signal $DLCP_N$ representing the comparison result. Specifically, the $N^{th}$ data level comparator 114-N outputs $DLCP_N=1$ when the level of the data included in the signal $EQ_{OUT}$ is greater than the $N^{th}$ updated reference data level $DLUR_N$, and outputs $DLCP_N=0$ when the level of the data included in the signal $EQ_{OUT}$ is smaller than the $N^{th}$ updated reference data level $DLUR_N$.

The $K^{th}$ data level comparator 114-K (where "$K^{th}$ data level comparator 114-K" represents any one of the first data level comparator 114-1 through the $N^{th}$ data level comparator 114-N) outputs a signal $DLCP_K$ representing a comparison result obtained by comparing the signal $EQ_{OUT}$ with the $K^{th}$ updated reference data level $DLUR_K$ for each clock CLK. Specifically, the $K^{th}$ data level comparator 114-K outputs $DLCP_K=1$ when the level of the data included in the signal $EQ_{OUT}$ is greater than the $K^{th}$ updated reference data level $DLUR_K$, and outputs $DLCP_K=0$ when the level of the data included in the signal $EQ_{OUT}$ is smaller than the $K^{th}$ updated reference data level $DLUR_K$.

The $(K-1)^{th}$ data level comparator 114-(K-1), which is adjacent to the $K^{th}$ data level comparator 114-K, outputs a signal $DLCP_{(K-1)}$ representing a comparison result obtained by comparing the signal $EQ_{OUT}$ with the $(K-1)^{th}$ updated reference data level $DLUR_{(K-1)}$ for each clock CLK. Specifically, the $(K-1)^{th}$ data level comparator 114-(K-1) outputs $DLCP_{(K-1)}=1$ when the level of the data included in the signal $EQ_{OUT}$ is greater than the $(K-1)^{th}$ updated reference data level $DLUR_{(K-1)}$, and outputs $DLCP_{(K-1)}=0$ when the level of the data included in the signal $EQ_{OUT}$ is smaller than the $(K-1)^{th}$ updated reference data level $DLUR_{(K-1)}$.

Here, K is a natural number satisfying $1 \leq K \leq N$, and $DLUR_1, DLUR_2, DLUR_3, \ldots, DLUR_{(N-1)}$, and $DLUR_N$ satisfy $DLUR_1 < DLUR_2 < DLUR_3 < \ldots < DLUR_{(N-1)} < DLUR_N$. In other words, each of the first data level comparator 114-1 through the $N^{th}$ data level comparator 114-N compare the level of the data included in the signal $EQ_{OUT}$ with the corresponding updated reference data level thereof.

The signal $DLCP_1$ through the signal $DLCP_N$ outputted by the first data level comparator 114-1 through the $N^{th}$ data level comparator 114-N, respectively, are used to determined which one of the level of the data included in the signal $EQ_{OUT}$ and the updated reference data level is greater. For example, when the data included in the signal $EQ_{OUT}$ is determined to have a level of the $N^{th}$ data level $DL_N$ by the first threshold voltage comparator 112-1 through the $(N-1)^{th}$ threshold voltage comparator 112-(N-1), and the signal $DLCP_N$ outputted by the $N^{th}$ data level comparator 114-N is "1", the level of the data included in the signal $EQ_{OUT}$ is deduced or determined to be greater than the $N^{th}$ updated reference data level $DLUR_N$. Similarly, when the data included in the signal $EQ_{OUT}$ is determined to have a level of the first data level $DL_1$ by the first threshold voltage comparator 112-1 through the $(N-1)^{th}$ threshold voltage comparator 112-(N-1), and the signal $DLCP_1$ outputted by the first data level comparator 114-1 is "0", the level of the data included in the signal $EQ_{OUT}$ is deduced or determined to be smaller than the first updated reference data level $DLUR_1$.

This may be applied to the $K^{th}$ data level comparator 114-K as follows.

When the data included in the signal $EQ_{OUT}$ is determined to have a level of the $K^{th}$ data level $DL_K$ by the first threshold voltage comparator 112-1 through the $(N-1)^{th}$ threshold voltage comparator 112-(N-1), and the signal $DLCP_K$ outputted by the $K^{th}$ data level comparator 114-K is "1", the level of the data included in the signal $EQ_{OUT}$ is deduced or determined to be greater than the $K^{th}$ updated reference data level $DLUR_K$.

In addition, when the level of the data included in the signal $EQ_{OUT}$ is determined to be the $K^{th}$ data level $DL_K$ by the first threshold voltage comparator 112-1 through the $(N-1)^{th}$ threshold voltage comparator 112-(N-1), and the signal $DLCP_K$ outputted by the $K^{th}$ data level comparator 114-K is "0", the level of the data included in the signal $EQ_{OUT}$ is deduced or determined to be smaller than the $K^{th}$ updated reference data level $DLUR_K$.

The sampler 110 outputs an output signal $SMPL_{OUT}$ which contains the signal $THCP_1$ through the signal $THCP_{(N-1)}$ outputted by the first threshold voltage comparator 112-1 through the $(N-1)^{th}$ threshold voltage comparator 112-(N-1), respectively, and the signal $DLCP_1$ through the signal $DLCP_N$ outputted by the first data level comparator 114-1 through the $N^{th}$ data level comparator 114-N, respectively.

The output signal $SMPL_{OUT}$ is transmitted to the controller 130 via the DEMUX 120 as a signal $DATA_{OUT}$.

The controller 130 adjusts the first reference data level $DLR_1$ through the $N^{th}$ reference data level $DLR_N$ and the first threshold voltage $VTH_1$ through the $(N-1)^{th}$ threshold voltage $VTH_{(N-1)}$ according to the output signal $SMPL_{OUT}$ of the sampler 110

Specifically, as shown in FIG. 6, the controller 130 includes a threshold voltage controller 132 and a reference data level controller 134.

The reference data level controller 134 adjusts the first reference data level $DLR_1$ through the $N^{th}$ reference data level $DLR_N$ according to the signal $DLCP_1$ to the signal $DLCP_N$ outputted by the first data level comparator 114-1 through the $N^{th}$ data level comparator 114-N, respectively and included in the output signal $SMPL_{OUT}$.

More specifically, for example, when the data included in the signal $EQ_{OUT}$ is determined to have a level of the first data level $DL_1$ by the first threshold voltage comparator 112-1 through the $(N-1)^{th}$ threshold voltage comparator 112-(N-1), and the signal $DLCP_1$ outputted from the first data level comparator 114-1 is "1", the reference data level controller 134 increases the first reference data level $DLR_1$ by a predetermined value to generate the first updated reference data level $DLUR_1$.

Contrarily, when the data included in the signal $EQ_{OUT}$ is determined to have a level of the first data level $DL_1$ by the first threshold voltage comparator 112-1 through the $(N-1)^{th}$ threshold voltage comparator 112-(N-1), and the signal $DLCP_1$ outputted from the first data level comparator 114-1 is "0", the reference data level controller 134 decreases the first reference data level $DLR_1$ by a predetermined value to generate the first updated reference data level $DLUR_1$.

Similarly, for example, when the data included in the signal $EQ_{OUT}$ is determined to have a level of the second data level $DL_2$ by the first threshold voltage comparator 112-1 through the $(N-1)^{th}$ threshold voltage comparator 112-(N-1), and the signal $DLCP_2$ outputted from the second data level comparator 114-2 is "1", the reference data level controller 134 increases the second reference data level $DLR_2$ by a predetermined value to generate the second updated reference data level $DLUR_2$.

Contrarily, when the data included in the signal $EQ_{OUT}$ is determined to have a level of the second data level $DL_2$ by the first threshold voltage comparator 112-1 through the $(N-1)^{th}$ threshold voltage comparator 112-(N-1), and the signal $DLCP_2$ outputted from the second data level comparator 114-2 is "0", the reference data level controller 134 decreases the second reference data level $DLR_2$ by a predetermined value to generate the second updated reference data level $DLUR_2$.

As another example, when the data included in the signal $EQ_{OUT}$ is determined to have a level of the third data level $DL_3$ by the first threshold voltage comparator 112-1 through the $(N-1)^{th}$ threshold voltage comparator 112-(N-1), and the signal $DLCP_3$ outputted from the third data level comparator 114-3 is "1", the reference data level controller 134 increases the third reference data level $DLR_3$ by a predetermined value to generate the third updated reference data level $DLUR_3$.

Contrarily, when the data included in the signal $EQ_{OUT}$ is determined to have a level of the third data level $DL_3$ by the first threshold voltage comparator 112-1 through the $(N-1)^{th}$ threshold voltage comparator 112-(N-1), and the signal $DLCP_3$ outputted from the third data level comparator 114-3 is "0", the reference data level controller 134 decreases the third reference data level $DLR_3$ by a predetermined value to generate the third updated reference data level $DLUR_3$.

Figure 9A:
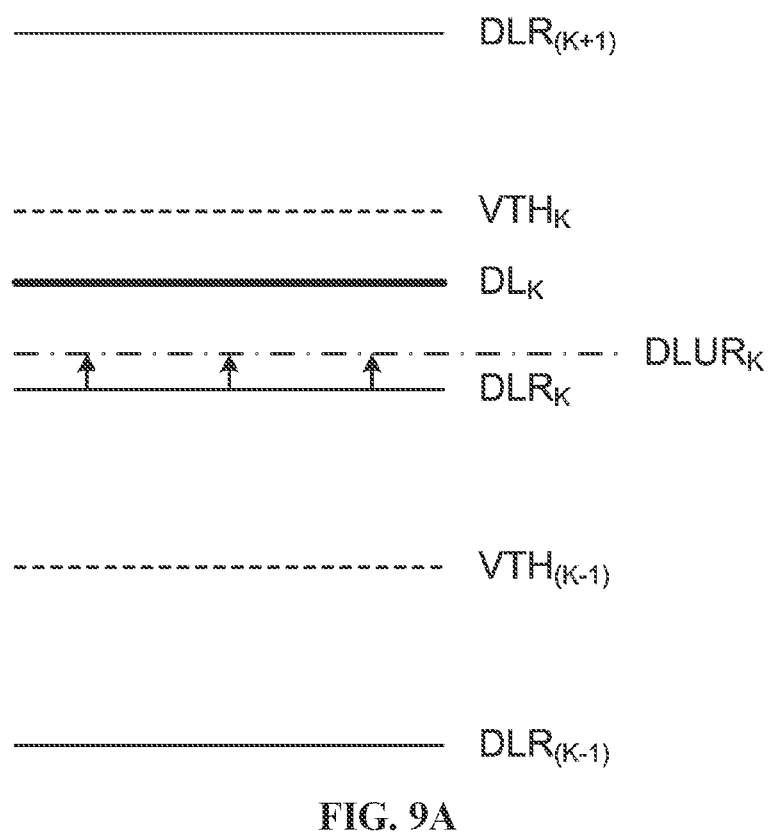
FIGS. 9A and 9B are diagrams illustrating an increase/decrease of a reference data level according to a data level of a received signal.

This may be applied to the $K^{th}$ data level comparator 114-K described above. For example, when the data included in the signal $EQ_{OUT}$ is determined to have a level of the $K^{th}$ data level $DL_K$ by the first threshold voltage comparator 112-1 through the $(N-1)^{th}$ threshold voltage comparator 112-(N-1), and the signal $DLCP_K$ outputted from the $K^{th}$ data level comparator 114-K is "1" (that is, when $DL_K > DLR_K$ as shown in FIG. 9A), the reference data level controller 134 increases the $K^{th}$ reference data level $DLR_K$ by a predetermined voltage to generate the $K^{th}$ updated reference data level $DLUR_K$.

Figure 9B:
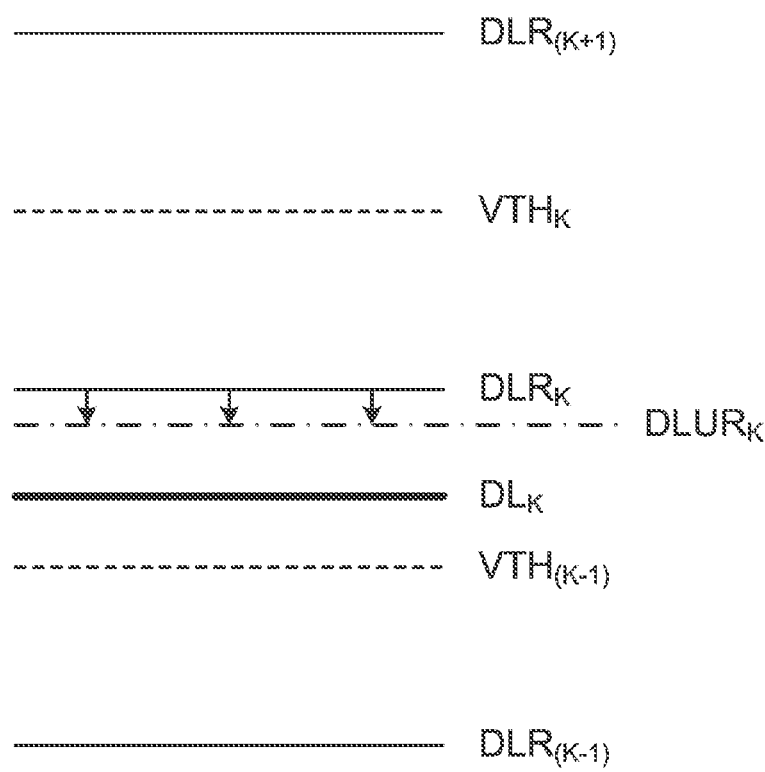

In addition, as another example, when the data included in the signal $EQ_{OUT}$ is determined to have a level of the $K^{th}$ data level $DL_K$ by the first threshold voltage comparator 112-1 through the $(N-1)^{th}$ threshold voltage comparator 112-(N-1), and the signal $DLCP_K$ outputted from the $K^{th}$ data level comparator 114-K is "0" (that is, when $DL_K < DLR_K$ as shown in FIG. 9B), the reference data level controller 134 decreases the $K^{th}$ reference data level $DLR_K$ by a predetermined voltage to generate the $K^{th}$ updated reference data level $DLUR_K$.

The reference data level controller 134 provides the first updated reference data level $DLUR_1$ through the $N^{th}$ updated reference data level $DLUR_N$ to the sampler 110.

The sampler 110 compares the received signal RS (or equalized signal $EQ_{OUT}$) with the first updated reference data level $DLUR_1$ through the $N^{th}$ updated reference data level $DLUR_N$ and to determine which one of the received signal RS (or equalized signal $EQ_{OUT}$) and the first updated reference data level $DLUR_1$ through the $N^{th}$ updated reference data level $DLUR_N$ is greater, and provides the comparison result to the controller 130. That is, the sampler 110 updates the first reference data level $DLR_1$ through the $N^{th}$ reference data level $DLR_N$ with the first updated reference data level $DLUR_1$ through the $N^{th}$ updated reference data level $DLUR_N$, and each data included in the received signal RS (or equalized signal $EQ_{OUT}$) is subjected to the process described above.

The threshold voltage controller 132 calculates at least one of a $(K-1)^{th}$ updated threshold voltage $VUTH_{(K-1)}$ and a $K^{th}$ updated threshold voltage $VUTH_K$ from the $K^{th}$ updated reference data level $DLUR_K$, and updates at least one of the $(K-1)^{th}$ threshold voltage $VTH_{(K-1)}$ and the $K^{th}$ threshold voltage $VTH_K$ of the sampler 110 with the calculated $(K-1)^{th}$ updated threshold voltage $VUTH_{(K-1)}$ and the calculated $K^{th}$ updated threshold voltage $VUTH_K$.

According to one embodiment of the present invention, the threshold voltage controller 132 generates the first updated threshold voltage $VUTH_1$ through the $(N-1)^{th}$ updated threshold voltage $VUTH_{(N-1)}$ from the first reference data level $DLR_1$ through $N^{th}$ reference data level $DLR_N$ and the first updated reference data level $DLUR_1$ through the $N^{th}$ updated reference data level $DLUR_N$ generated by the reference data level controller 134, thereby updating each threshold voltage of the sampler 110.

For example, as shown in equation 4 below, the threshold voltage controller 132 may update the $(K-1)^{th}$ threshold voltage $VTH_{(K-1)}$ with the $(K-1)^{th}$ updated threshold voltage $VUTH_{(K-1)}$ obtained from the average of the $K^{th}$ updated reference data level $DLUR_K$ and the $(K-1)^{th}$ reference data level $DLR_{(K-1)}$. That is, the threshold voltage controller 132 may update two neighboring threshold voltages from the $K^{th}$ updated reference data level $DLUR_K$.

$$VUTH_{(K-1)} = \frac{DLUR_K + DLR_{(K-1)}}{2} \quad \text{[Equation 4]}$$

In another embodiment, as shown in equation 5 below, the threshold voltage controller 132 may update the $K^{th}$ threshold voltage $VTH_K$ with the $K^{th}$ updated threshold voltage $VUTH_K$ obtained from the average of the $(K+1)^{th}$ reference data level $DLR_{(K+1)}$ and the $K^{th}$ updated reference data level $DLUR_K$.

$$VUTH_K = \frac{DLR_{(K+1)} + DLUR_K}{2} \quad \text{[Equation 5]}$$

The threshold voltage controller 132 may update only the $(K-1)^{th}$ threshold voltage $VTH_{(K-1)}$, update only the $K^{th}$ threshold voltage $VTH_K$, or update both of the $(K-1)^{th}$ threshold voltage $VTH_{(K-1)}$ and the $K^{th}$ threshold voltage $VTH_K$. That is, The threshold voltage controller 132 may update either the $(K-1)^{th}$ threshold voltage $VTH_{(K-1)}$ or the $K^{th}$ threshold voltage $VTH_K$, or both of the $(K-1)^{th}$ threshold voltage $VTH_{(K-1)}$ and the $K^{th}$ threshold voltage $VTH_K$ from the $K^{th}$ updated reference data level $DLUR_K$ which is generated when there is a change in the $K^{th}$ reference data level $DLR_K$. However, when the first reference data level $DLR_1$ is adjusted to generate the first updated reference data level $DLUR_1$, only the first threshold voltage $VTH_1$ is updated, and when the $N^{th}$ reference data level $DLR_N$ is adjusted to generate the $N^{th}$ updated reference data level $DLUR_N$, only the $(N-1)^{th}$ threshold voltage $VTH_{(N-1)}$ is updated.

Here, "update" means to replace the old value with a new value. For example, "to update the $K^{th}$ threshold voltage $VTH_K$ with the $K^{th}$ updated threshold voltage $VUTH_K$" means that "the value of the $K^{th}$ threshold voltage $VTH_K$ is replaced with that of the $K^{th}$ updated threshold voltage $VUTH_K$," or "the value of the $K^{th}$ threshold voltage $VTH_K$ is overwritten by that of the $K^{th}$ updated threshold voltage $VUTH_K$."

The threshold voltage controller 132 provides the first updated threshold voltage $VUTH_1$ through the $(N-1)^{th}$ updated threshold voltage $VUTH_{(N-1)}$ to the sampler 110.

The sampler 110 may update the first threshold voltage $VTH_1$ through the $(N-1)^{th}$ threshold voltage $VTH_{(N-1)}$ with the first threshold voltage $VUTH_1$ through the $(N-1)^{th}$ updated threshold voltage $VUTH_{(N-1)}$, respectively, and compare the updated threshold voltage with the level of the data.

That is, as shown in FIG. 7B, the sampler 110 compares the data included in the output signal $EQ_{OUT}$ with the first updated reference data level $DLUR_1$ through the $N^{th}$ updated reference data level $DLUR_N$ and the first updated threshold voltage $VUTH_1$ through the $(N-1)^{th}$ updated threshold voltage $VUTH_{(N-1)}$ provided by the controller 130, and provides the comparison result as the output signal $SMPL_{OUT}$ to the controller 130. While FIG. 7B shows the first updated reference data level $DLUR_1$ through the $N^{th}$ updated reference data level $DLUR_N$ and the first updated threshold voltage $VUTH_1$ through the $(N-1)^{th}$ updated threshold voltage $VUTH_{(N-1)}$, the entirety of the first updated reference data level $DLUR_1$ through the $N^{th}$ updated reference data level $DLUR_N$ and the first updated threshold voltage $VUTH_1$ through the $(N-1)^{th}$ updated threshold voltage $VUTH_{(N-1)}$ may or may not be updated. For example, only the first reference data level $DLR_1$ may be updated with the first updated reference data level $DLUR_1$ depending on the level of the output signal $EQ_{OUT}$. Similarly, only the second threshold voltage $VTH_2$ and the fourth threshold voltage $VTH_4$ may be updated with second updated threshold voltage $VUTH_2$ and the fourth updated threshold voltage $VUTH_4$, respectively, depending on the level of the output signal $EQ_{OUT}$. In other words, when the reference data level controller 134 and the threshold voltage controller 132 generate any updated reference data levels and updated threshold voltages, the updated reference data levels and the updated threshold voltages are provided to the sampler 110 and the reference data levels and the threshold voltages of the sampler 110 are replaced with the updated reference data levels and the updated threshold voltages, respectively. A detailed description will be given with reference to FIG. 8A through FIG. 8E later.

According to another embodiment of the present invention, when the received signal RS or equalized signal $EQ_{OUT}$ is a differential signal, all of the first updated threshold voltage $VUTH_1$ through the $(N-1)^{th}$ updated threshold voltage $VUTH_{(N-1)}$ are not required to be calculated. Specifically, since the differential signal includes a differential pair consisting of non-inverted and inverted signals, a threshold voltage for the non-inverted signal may be inverted to obtain a threshold voltage for the inverted signal.

That is, when the received signal RS or equalized signal $EQ_{OUT}$ is a differential signal, the threshold voltage controller 132 may invert the $(K-1)^{th}$ updated threshold voltage $VUTH_{(K-1)}$ to generate the $(N-K+1)^{th}$ updated threshold voltage $VUTH_{(N-K+1)}$, and both of the $(K-1)^{th}$ updated threshold voltage $VUTH_{(K-1)}$ and the $(N-K+1)^{th}$ updated threshold voltage $VUTH_{(N-K+1)}$ may be provided to the sampler 110.

To facilitate the understanding of the present invention, an example receiver according to the present invention capable of receiving a PAM-4 signal will be described with reference to FIGS. 8A through 8F.

Figure 8A:
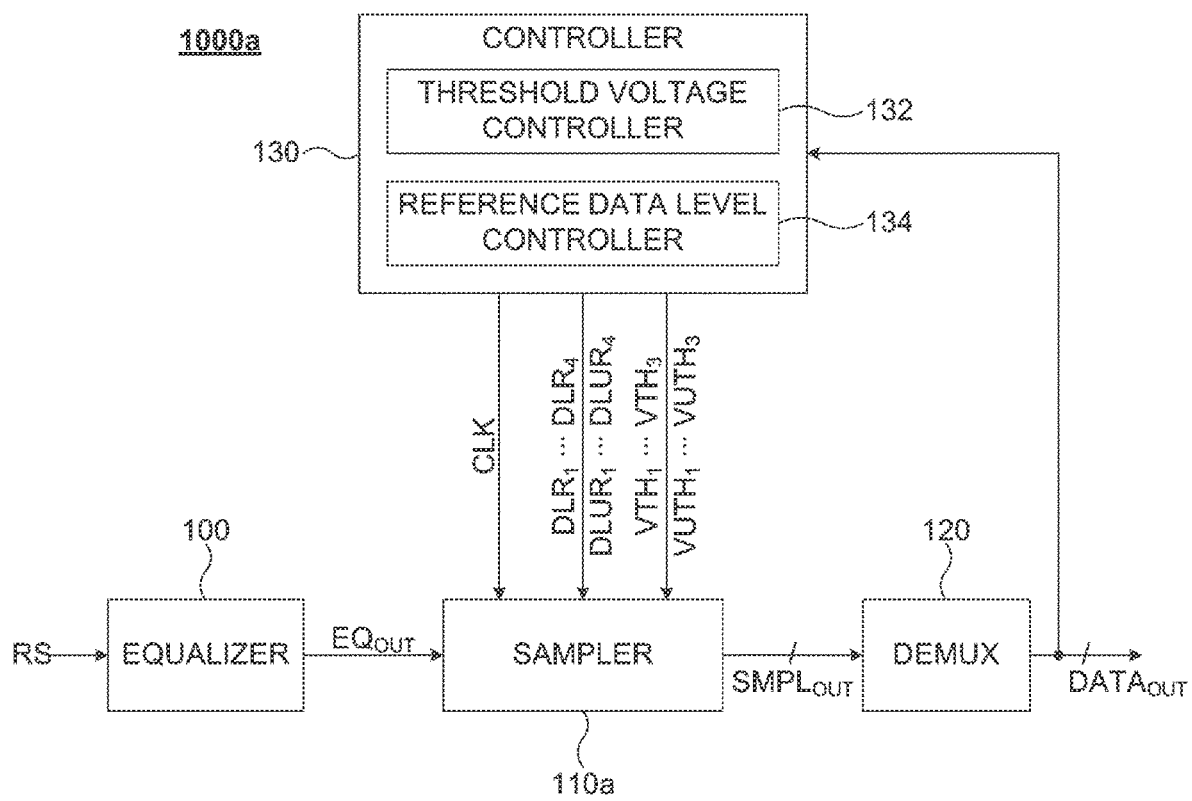
FIGS. 8A through 8F are block diagrams illustrating a PAM-4 receiver and a sampler according to the present invention.

FIG. 8A is a block diagram illustrating a PAM-4 receiver 1000a according to the present invention. The PAM-4 receiver 1000a according to the present invention shown in FIG. 8A is identical to the PAM-N receiver 1000 shown in FIG. 6 except the configuration of a sampler 110a and the signals provided to the controller 130. Therefore, the PAM-4 receiver 1000a according to the present invention will be described with a focus on the configuration of the sampler 110a and the signals exchanged between the sampler 110a and the controller 130 hereinafter.

Figure 8B:
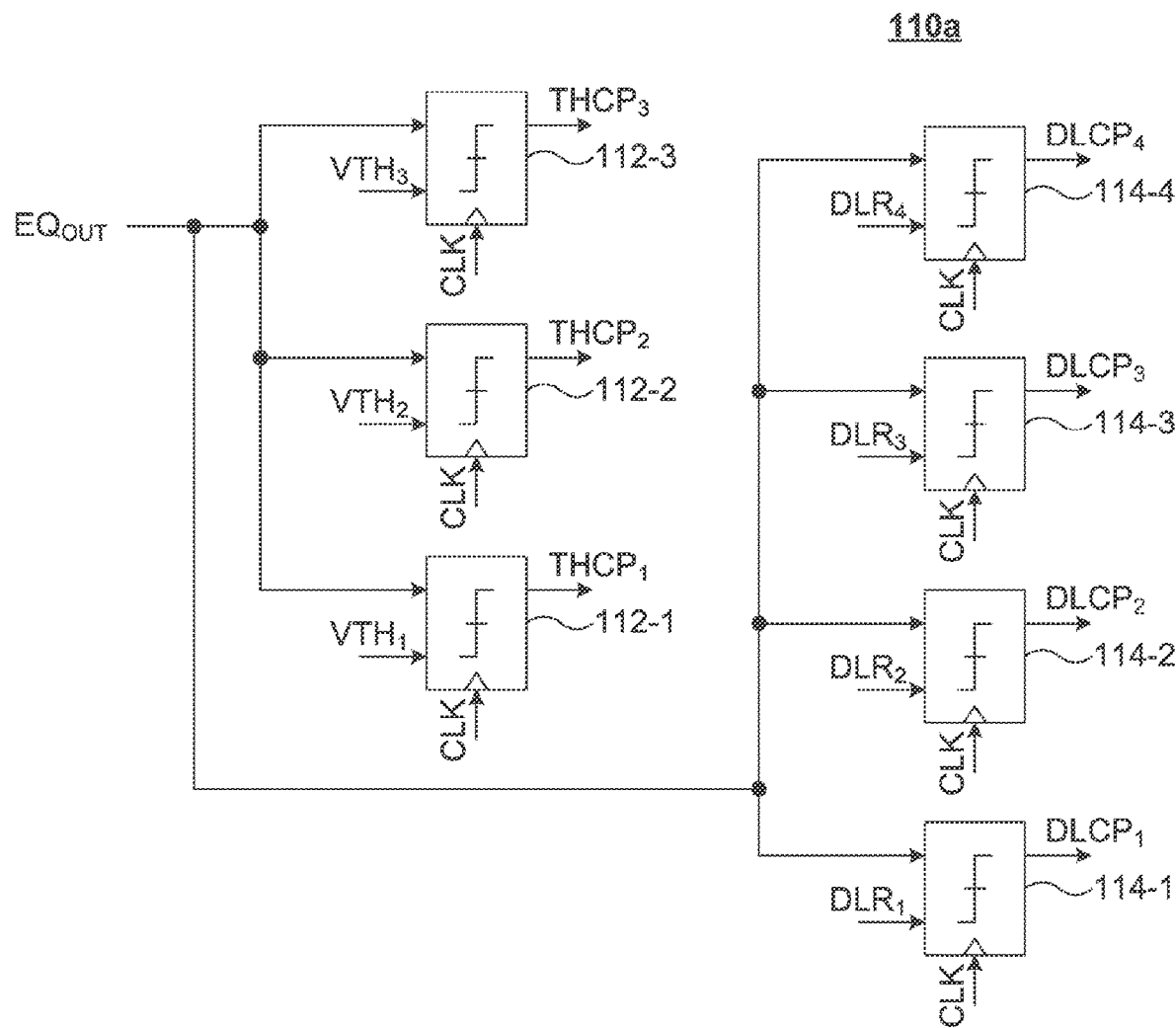

FIG. 8B is a diagram illustrating the sampler 110a capable of sampling a PAM-4 signal. That is, the sampler 110a shown in FIG. 8B is the same as the sampler 110 shown in FIG. 7A when N=4.

Referring to FIG. 8B, the sampler 110a includes a first threshold voltage comparator 112-1 through a third threshold voltage comparator 112-3 and a first data level comparator 114-1 through a fourth data level comparator 114-4.

The first threshold voltage comparator 112-1 through the third threshold voltage comparator 112-3 compare the level of each data included in the signal $EQ_{OUT}$ with the first threshold voltage $VTH_1$ to the third threshold voltage $VTH_3$, and output the comparison result.

For example, the first threshold voltage comparator 112-1 compares the signal $EQ_{OUT}$ with the first threshold voltage $VTH_1$ for each clock CLK and outputs a signal $THCP_1$ representing a comparison result. That is, the first threshold voltage comparator 112-1 outputs $THCP_1=1$ for each data when the level of the data included in the signal $EQ_{OUT}$ is greater than the first threshold voltage $VTH_1$, and outputs $THCP_1=0$ for each data when the level of the data included in the signal $EQ_{OUT}$ is smaller than the first threshold voltage $VTH_1$.

The second threshold voltage comparator 112-2 compares the signal $EQ_{OUT}$ with the second threshold voltage $VTH_2$ for each clock CLK and outputs a signal $THCP_2$ representing a comparison result. That is, the second threshold voltage comparator 112-2 outputs $THCP_2=1$ for each data when the level of the data included in the signal $EQ_{OUT}$ is greater than the second threshold voltage $VTH_2$, and outputs $THCP_2=0$ for each data when the level of the data included in the signal $EQ_{OUT}$ is smaller than the second threshold voltage $VTH_2$.

The third threshold voltage comparator 112-3 compares the signal $EQ_{OUT}$ with the third threshold voltage $VTH_3$ for each clock CLK and outputs a signal $THCP_3$ representing a comparison result. That is, the third threshold voltage comparator 112-3 outputs $THCP_3=1$ for each data when the level of the data included in the signal $EQ_{OUT}$ is greater than the third threshold voltage $VTH_3$, and outputs $THCP_3=0$ for each data when the level of the data included in the signal $EQ_{OUT}$ is smaller than the third threshold voltage $VTH_3$.

The level of the data contained in the signal $EQ_{OUT}$ is determined from the signal $THCP_1$ through the signal $THCP_3$ outputted by the first threshold voltage comparator 112-1 through the third threshold voltage comparator 112-3, respectively. For example, when the signal $THCP_1$ through the signal $THCP_3$ outputted by the first threshold voltage comparator 112-1 through the third threshold voltage comparator 112-3, respectively, are all "1", the level of the data included in the signal $EQ_{OUT}$ is determined as the fourth data level $DL_4$. When the signal $THCP_1$ and the signal $THCP_2$ outputted by the first threshold voltage comparator 112-1 and the second threshold voltage comparator 112-2, respectively, are both "1", and the signal $THCP_3$ outputted by the third threshold voltage comparator 112-3 is "0", the level of the data included in the signal $EQ_{OUT}$ is determined as the third data level $DL_3$. When the signal $THCP_1$ outputted by the first threshold voltage comparator 112-1 is "1", and the signal $THCP_2$ and the signal $THCP_3$ outputted by the second threshold voltage comparator 112-2 and the third threshold voltage comparator 112-3, respectively, are both "0", the level of the data included in the signal $EQ_{OUT}$ is determined as the second data level $DL_2$. When the signal $THCP_1$ through the signal $THCP_3$ outputted by the first threshold voltage comparator 112-1 through the third threshold voltage comparator 112-3, respectively, are all "0", the level of the data included in the signal $EQ_{OUT}$ is determined as the first data level $DL_1$. Therefore, the level of the data included in the signal $EQ_{OUT}$ may be determined by checking the values outputted by the first threshold voltage comparator 112-1 through the third threshold voltage comparator 112-3.

The first data level comparator 114-1 through the fourth data level comparator 114-4 compare the level of the data included in the signal $EQ_{OUT}$ with the first reference data level $DLR_1$ through the fourth reference data level $DLR_4$, respectively, and output the comparison result thereof.

For example, the first data level comparator 114-1 compares the signal $EQ_{OUT}$ with the first reference data level $DLR_1$ for each clock CLK, and outputs a signal $DLCP_1$ representing the comparison result. Specifically, the first data level comparator 114-1 outputs $DLCP_1=1$ when the level of the data included in the signal $EQ_{OUT}$ is greater than the first reference data level $DLR_1$, and outputs $DLCP_1=0$ when the level of the data included in the signal $EQ_{OUT}$ is smaller than the first reference data level $DLR_1$.

The second data level comparator 114-2 compares the signal $EQ_{OUT}$ with the second reference data level $DLR_2$ for each clock CLK, and outputs a signal $DLCP_2$ representing the comparison result. Specifically, the second data level comparator 114-2 outputs $DLCP_2=1$ when the level of the data included in the signal $EQ_{OUT}$ is greater than the second reference data level $DLR_2$, and outputs $DLCP_2=0$ when the level of the data included in the signal $EQ_{OUT}$ is smaller than the second reference data level $DLR_2$.

The third data level comparator 114-3 compares the signal $EQ_{OUT}$ with the third reference data level $DLR_3$ for each clock CLK, and outputs a signal $DLCP_3$ representing the comparison result. Specifically, the third data level comparator 114-3 outputs $DLCP_3=1$ when the level of the data included in the signal $EQ_{OUT}$ is greater than the third reference data level $DLR_3$, and outputs $DLCP_3=0$ when the level of the data included in the signal $EQ_{OUT}$ is smaller than the third reference data level $DLR_3$.

The fourth data level comparator 114-4 compares the signal $EQ_{OUT}$ with the fourth reference data level $DLR_4$ for each clock CLK, and outputs a signal $DLCP_4$ representing the comparison result. Specifically, the fourth data level comparator 114-4 outputs $DLCP_4=1$ when the level of the data included in the signal $EQ_{OUT}$ is greater than the fourth reference data level $DLR_4$, and outputs $DLCP_4=0$ when the level of the data included in the signal $EQ_{OUT}$ is smaller than the fourth reference data level $DLR_4$.

In other words, each of the first data level comparator 114-1 through the fourth data level comparator 114-4 compare the level of the data included in the signal $EQ_{OUT}$ with the corresponding reference data level thereof.

The signal $DLCP_1$ through the signal $DLCP_4$ outputted by the first data level comparator 114-1 through the fourth data level comparator 114-4, respectively, are used to determined which one of the level of the data included in the signal $EQ_{OUT}$ and the reference data level is greater.

For example, when the level of the data included in the signal $EQ_{OUT}$ is determined to be the first data level $DL_1$ by the first threshold voltage comparator 112-1 through the third threshold voltage comparator 112-3, and the signal $DLCP_1$ outputted by the first data level comparator 114-1 is "0", the level of the data included in the signal $EQ_{OUT}$ is deduced or determined to be smaller than the first reference data level $DLR_1$. Similarly, when the level of the data included in the signal $EQ_{OUT}$ is determined to be the first data level $DL_1$ by the first threshold voltage comparator 112-1 through the third threshold voltage comparator 112-3, and the signal $DLCP_1$ outputted by the fourth data level comparator 114-1 is "1", the level of the data included in the signal $EQ_{OUT}$ is deduced or determined to be greater than the first reference data level $DLR_1$.

When the level of the data included in the signal $EQ_{OUT}$ is determined to be the second data level $DL_2$ by the first threshold voltage comparator 112-1 through the third threshold voltage comparator 112-3, and the signal $DLCP_2$ outputted by the second data level comparator 114-2 is "1", the level of the data included in the signal $EQ_{OUT}$ is deduced or determined to be greater than the second reference data level $DLR_2$.

In another example, when the level of the data included in the signal $EQ_{OUT}$ is determined to be the fourth data level $DL_4$ by the first threshold voltage comparator 112-1 through the third threshold voltage comparator 112-3, and the signal $DLCP_4$ outputted by the fourth data level comparator 114-4 is "1", the level of the data included in the signal $EQ_{OUT}$ is deduced or determined to be greater than the fourth reference data level $DLR_4$.

The sampler 110a outputs the output signals $SMPL_{OUT}$ containing the signal $THCP_1$ through the signal $THCP_3$ outputted by the first threshold voltage comparator 112-1 through the third threshold voltage comparator 112-3, respectively, and the signal $DLCP_1$ through the signal $DLCP_4$ outputted by the first data level comparator 114-1 through the fourth data level comparator 114-4, respectively.

The output signal $SMPL_{OUT}$ is transmitted to the controller 130 via the DEMUX 120 as a signal $DATA_{OUT}$.

The controller 130, upon receiving the output signal $SMPL_{OUT}$, updates the threshold voltages and the reference data levels according to the signals $THCP_1$ through the signal $THCP_3$ and the signal $DLCP_1$ through the signal $DLCP_4$ included in the output signal $SMPL_{OUT}$.

Specifically, the reference data level controller 134 adjusts the first reference data level $DLR_1$ through the fourth reference data level $DLR_4$ based on the signal $DLCP_1$ through the signal $DLCP_4$ outputted by the first data level comparator 114-1 through the fourth data level comparator 114-4, respectively, and included in the output signal $SMPL_{OUT}$.

More specifically, for example, when the level of the data included in the signal $EQ_{OUT}$ is determined as the first data level $DL_1$ by the first threshold voltage comparator 112-1 through the third threshold voltage comparator 112-3, and the signal $DLCP_1$ outputted from the first data level comparator 114-1 is "0", the reference data level controller 134 decreases the first reference data level $DLR_1$ by a predetermined value to generate the first updated reference data level $DLUR_1$. When the level of the data included in the signal $EQ_{OUT}$ is determined as the first data level $DL_1$ by the first threshold voltage comparator 112-1 through the third threshold voltage comparator 112-3, and the signal $DLCP_1$ outputted from the first data level comparator 114-1 is "1", the reference data level controller 134 increases the first reference data level $DLR_1$ by a predetermined value to generate the first updated reference data level $DLUR_1$.

Similarly, for example, when the level of the data included in the signal $EQ_{OUT}$ is determined as the second data level $DL_2$ by the first threshold voltage comparator 112-1 through the third threshold voltage comparator 112-3, and the signal $DLCP_2$ outputted from the second data level comparator 114-2 is "0", the reference data level controller 134 decreases the second reference data level $DLR_2$ by a predetermined value to generate the second updated reference data level $DLUR_2$. When the level of the data included in the signal $EQ_{OUT}$ is determined as the second data level $DL_2$ by the first threshold voltage comparator 112-1 through the third threshold voltage comparator 112-3, and the signal $DLCP_2$ outputted from the second data level comparator 114-2 is "1", the reference data level controller 134 increases the second reference data level $DLR_2$ by a predetermined value to generate the second updated reference data level $DLUR_2$.

As another example, when the level of the data included in the signal $EQ_{OUT}$ is determined as the third data level $DL_3$ by the first threshold voltage comparator 112-1 through the third threshold voltage comparator 112-3, and the signal $DLCP_3$ outputted from the third data level comparator 114-3 is "0", the reference data level controller 134 decreases the third reference data level $DLR_3$ by a predetermined value to generate the third updated reference data level $DLUR_3$. When the level of the data included in the signal $EQ_{OUT}$ is determined as the third data level $DL_3$ by the first threshold voltage comparator 112-1 through the third threshold voltage comparator 112-3, and the signal $DLCP_3$ outputted from the third data level comparator 114-3 is "1", the reference data level controller 134 increases the third reference data level $DLR_3$ by a predetermined value to generate the third updated reference data level $DLUR_3$.

As yet another example, when the level of the data included in the signal $EQ_{OUT}$ is determined as the fourth data level $DL_4$ by the first threshold voltage comparator 112-1 through the third threshold voltage comparator 112-3, and the signal $DLCP_4$ outputted from the fourth data level comparator 114-4 is "0", the reference data level controller 134 decreases the fourth reference data level $DLR_4$ by a predetermined value to generate the fourth updated reference data level $DLUR_4$. When the level of the data included in the signal $EQ_{OUT}$ is determined as the fourth data level $DL_4$ by the first threshold voltage comparator 112-1 through the third threshold voltage comparator 112-3, and the signal $DLCP_4$ outputted from the fourth data level comparator 114-4 is "1", the reference data level controller 134 increases the fourth reference data level $DLR_4$ by a predetermined value to generate the fourth updated reference data level $DLUR_4$.

Threshold voltage controller 132 calculates the first updated threshold voltage $VUTH_1$ through the third updated threshold voltage $VUTH_3$ from the first updated reference data level $DLUR_1$ through the fourth updated reference data level $DLUR_4$ generated by the reference data level controller 134.

For example, when the third reference data level $DLR_3$ is updated with the third updated reference data level $DLUR_3$, the second updated threshold voltage $VUTH_2$ may be calculated from equation 6 below. That is, when the third updated reference data level $DLUR_3$ is generated by updating the third reference data level $DLR_3$, the second threshold voltage $VUTH_2$ may also be updated with the second updated threshold voltage $VUTH_2$ which is an average value of the second reference data level $DLR_2$ and the third updated reference data level $DLUR_3$ according to the equation 6 below.

$$VUTH_2 = \frac{DLUR_3 + DLR_2}{2} \quad \text{[Equation 6]}$$

In addition, when the third updated reference data level $DLUR_3$ is generated to update the reference data level $DLR_3$, the third threshold voltage $VTH_3$ may be updated with the third updated threshold voltage $VUTH_3$ which is an average value of the fourth reference data level $DLR_4$ and the third updated reference data level $DLUR_3$ according to equation 7 below.

$$VUTH_3 = \frac{DLR_4 + DLUR_3}{2} \quad \text{[Equation 7]}$$

That is, the threshold voltage controller 132 may update only the second threshold voltage $VTH_2$ from the third updated reference data level $DLUR_3$, update only the third threshold voltage $VTH_3$, or update both the second threshold voltage $VTH_2$ and the third threshold voltage $VTH_3$.

Similarly, when the second updated reference data level $DLUR_2$ is generated, and the second reference data level $DLR_2$ is updated, the first threshold voltage $VTH_1$ may be updated with the first updated threshold voltage $VUTH_1$ which is an average value of the first reference data level $DLR_1$ and the second updated reference data level $DLUR_2$ according to the equation 8 below.

$$VUTH_1 = \frac{DLUR_2 + DLR_1}{2} \quad \text{[Equation 8]}$$

In addition, when the second updated reference data level $DLUR_2$ is generated and the reference data level $DLR_2$ is updated, the second threshold voltage $VTH_2$ may be updated with the second updated threshold voltage $VUTH_2$ which is an average value of the third reference data level $DLR_3$ and the second updated reference data level $DLUR_2$ according to the equation 9 below.

$$VUTH_2 = \frac{DLR_3 + DLUR_2}{2} \quad \text{[Equation 9]}$$

That is, the threshold voltage controller 132 may update only the first threshold voltage $VTH_1$ from the second updated reference data level $DLUR_2$, update only the second threshold voltage $VTH_2$, or update both the first threshold voltage $VTH_1$ and the second threshold voltage $VTH_2$.

However, when the first updated reference data level $DLUR_1$ is generated by adjusting the first reference data level $DLR_1$, only the first threshold voltage $VTH_1$ is updated as shown in equation 10 below, and when the fourth reference data level $DLUR_1$ is generated by adjusting the fourth reference data level $DLR_1$, only the third threshold voltage $VTH_3$ is updated as in equation 11 below.

$$VUTH_1 = \frac{DLR_2 + DLUR_1}{2} \quad \text{[Equation 10]}$$

$$VUTH_3 = \frac{DLUR_4 + DLR_3}{2} \quad \text{[Equation 11]}$$

The controller 130 provides the first updated reference data level $DLUR_1$ through the third updated reference data level $DLUR_3$ and the first updated threshold voltage $VUTH_1$ through the third updated threshold voltage $VUTH_3$ to the sampler 110a.

Hereinafter, the PAM-4 receiver according to the present invention will be described in more detail with reference to FIGS. 8B through 8F.

In order to facilitate description, it is assumed that the PAM-4 receiver according to the present invention sequentially receives data "10", "01", "10" and "00".

The received data "10" is equalized by the equalizer 100 and outputted as the equalized signal $EQ_{OUT}$, and the signal $EQ_{OUT}$ is inputted to the sampler 110a.

As shown in FIG. 8B, the signal $EQ_{OUT}$ is inputted into the first threshold voltage comparator 112-1 through the third threshold voltage comparator 112-3 and also into the first data level comparator 114-1 through the fourth data level comparator 114-4, and is compared therewith. That is, the first threshold voltage comparator 112-1 through the third threshold voltage comparator 112-3 compare the level of the data corresponding to the data "10" included in the signal $EQ_{OUT}$ with the first threshold voltage $VTH_1$ through the third threshold voltage $VTH_3$, and the first data level comparator 114-1 through the fourth data level comparator 114-4 compare the level of the data corresponding to the data "10" included in the signal $EQ_{OUT}$ with the first reference data level $DLR_1$ through the fourth reference data level $DLR_4$.

Since the level of the data included in the signal $EQ_{OUT}$ corresponds to data "10", the first threshold voltage comparator 112-1 through the third threshold voltage comparator 112-3 should determine the level as the third data level $DL_3$. In addition, the third data level comparator 114-3 outputs $DLCP_3=0$ or $DLCP_3=1$ according to the result of comparison between the level of the data included in the signal $EQ_{OUT}$ and the third reference data level $DLR_3$. That is, the third data level comparator 114-3 outputs $DLCP_3=0$ or $DLCP_3=1$ depending on which one of the level of the data included in the signal $EQ_{OUT}$ and the third reference data level $DLR_3$ is greater.

The comparison result is transmitted to the controller 130. The controller 130 increases or decreases the third reference data level $DLR_3$ according to the value of $DLCP_3$ to generate an third updated reference data level $DLUR_3$, and generates a second updated threshold voltage $VUTH_2$ and a third updated threshold voltage $VUTH_3$ according to the equations 6 and 7.

The third updated reference data level $DLUR_3$, the second updated threshold voltage $VUTH_2$ and the third updated threshold voltage $VUTH_3$ are transmitted to the sampler 110a.

Figure 8C:
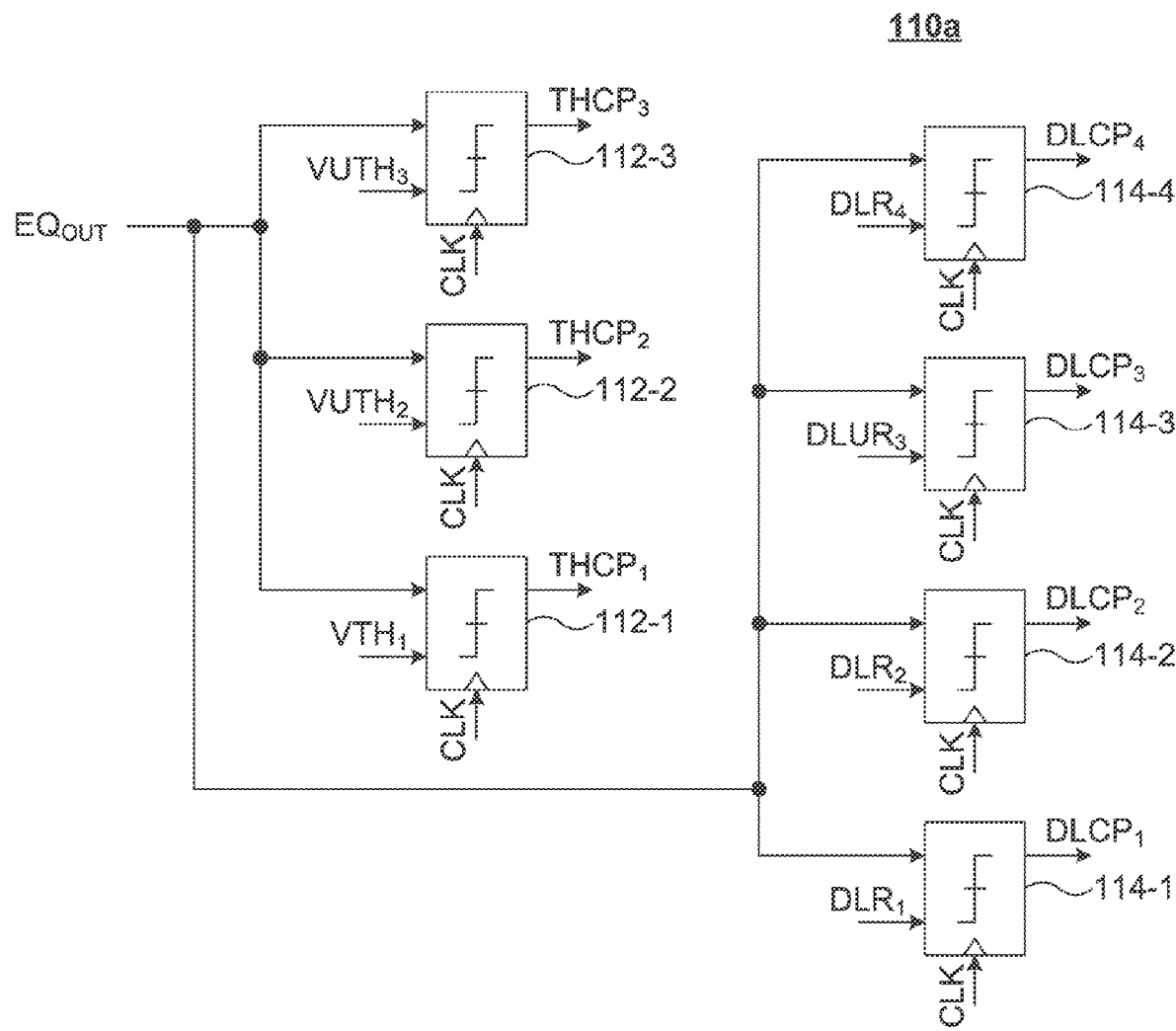

Once the third updated reference data level $DLUR_3$, the second updated threshold voltage $VUTH_2$ and the third updated threshold voltage $VUTH_3$ are received, the sampler 110*a* performs a comparison of the next data "01" as shown in FIG. 8C.

Specifically, the received data "01" is equalized by the equalizer 100 and outputted as an equalized signal $EQ_{OUT}$, which is then inputted to the sampler 110*a*.

As shown in FIG. 8C, the signal $EQ_{OUT}$ is inputted into the first threshold voltage comparator 112-1 through the third threshold voltage comparator 112-3 and also into the first data level comparator 114-1 through the fourth data level comparator 114-4, and is compared therewith. That is, the first threshold voltage comparator 112-1 through the third threshold voltage comparator 112-3 compare the level of the data corresponding to the data "01" included in the signal $EQ_{OUT}$ with the first threshold voltage $VTH_1$, the second updated threshold voltage $VUTH_2$ and the third updated threshold voltage $VUTH_3$, and the first data level comparator 114-1 through the fourth data level comparator 114-4 compare the level of the data corresponding to the data "01" included in the signal $EQ_{OUT}$ with the first reference data level $DLR_1$, the second reference data level $DLR_2$, the third updated reference data level $DLUR_3$ and the fourth reference data level $DLR_4$.

Since the level of the data included in the signal $EQ_{OUT}$ corresponds to data "01", the first threshold voltage comparator 112-1 through the third threshold voltage comparator 112-3 should determine the level as the second data level $DL_2$. In addition, the second data level comparator 114-2 outputs $DLCP_2=0$ or $DLCP_2=1$ according to the result of comparison between the level of the data included in the signal $EQ_{OUT}$ and the second reference data level $DLR_2$. That is, the second data level comparator 114-2 outputs $DLCP_2=0$ or $DLCP_2=1$ depending on which one of the level of the data included in the signal $EQ_{OUT}$ and the second reference data level $DLR_2$ is greater.

The comparison result is transmitted to the controller 130. The controller 130 increases or decreases the second reference data level $DLR_2$ according to the value of $DLCP_2$ to generate an second updated reference data level $DLUR_2$, and generates a first updated threshold voltage $VUTH_1$ and a second re-updated threshold voltage $VU2TH_2$ according to the equations 12 and 13.

$$VUTH_1 = \frac{DLUR_2 + DLR_1}{2} \quad \text{[Equation 12]}$$

$$VU2TH_2 = \frac{DLUR_3 + DLUR_2}{2} \quad \text{[Equation 13]}$$

In the case of equation 13, since the third updated reference data level $DLUR_3$ is generated by receiving data "10", and the second updated reference data level $DLUR_2$ is generated by receiving data "01", the second re-updated threshold voltage $VU2TH_2$ is calculated from the average of the third updated reference data level $DLUR_3$ and the second updated reference data level $DLUR_2$.

The second updated reference data level $DLUR_2$, the first updated threshold voltage $VUTH_1$ and the second re-updated threshold voltage $VU2TH_2$ are transmitted to the sampler 110*a*.

Figure 8D:
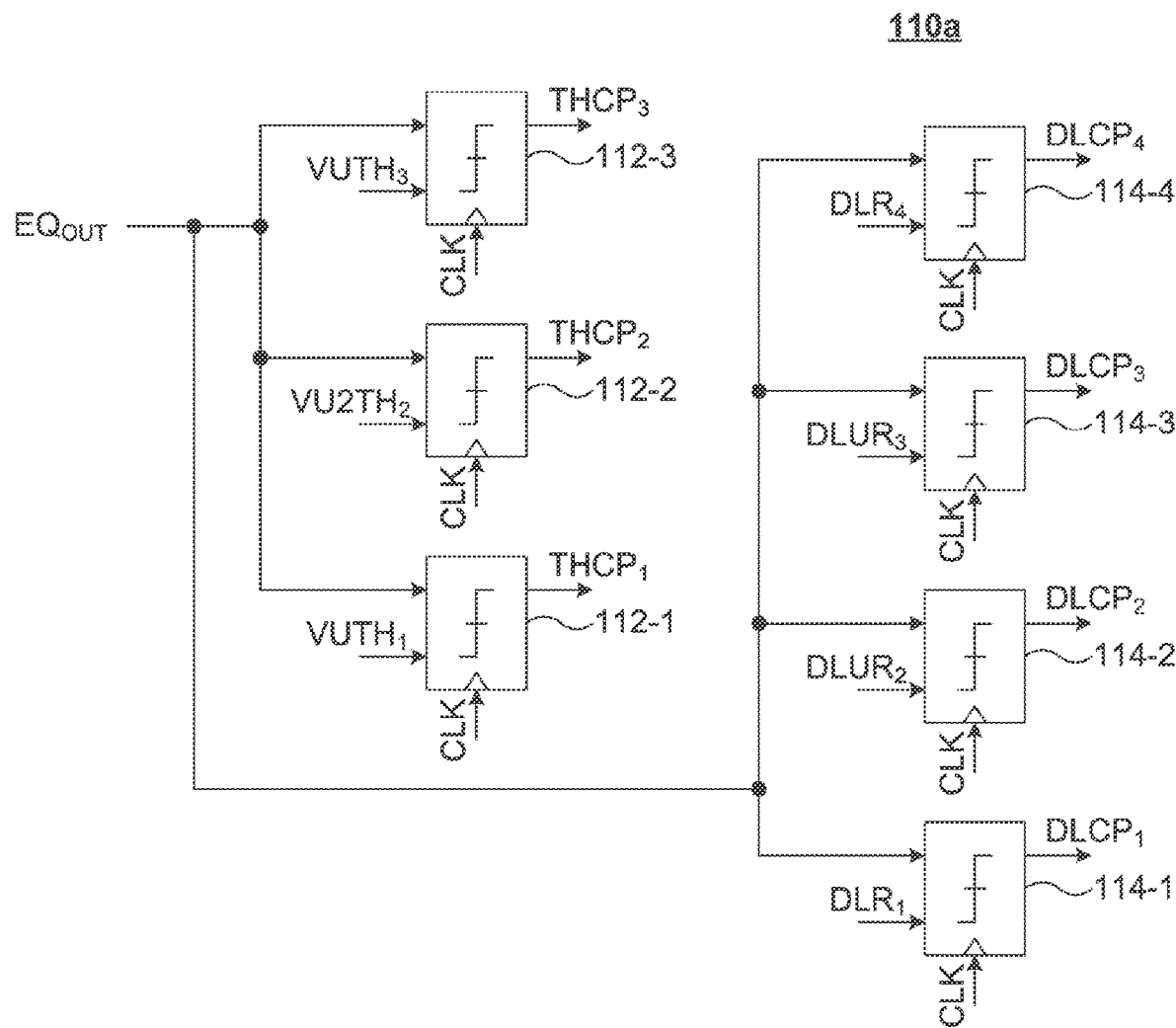

Once the second updated reference data level $DLUR_2$, the first updated threshold voltage $VUTH_1$ and the second re-updated threshold voltage $VU2TH_2$ are received, the sampler 110*a* performs a comparison of the next data "10" as shown in FIG. 8D.

Specifically, the received data "10" is equalized by the equalizer 100 and outputted as an equalized signal $EQ_{OUT}$, which is then inputted to the sampler 110*a*.

As shown in FIG. 8C, the signal $EQ_{OUT}$ is inputted into the first threshold voltage comparator 112-1 through the third threshold voltage comparator 112-3 and also into the first data level comparator 114-1 through the fourth data level comparator 114-4, and is compared therewith. That is, the first threshold voltage comparator 112-1 through the third threshold voltage comparator 112-3 compare the level of the data corresponding to the data "01" included in the signal $EQ_{OUT}$ with the first updated threshold voltage $VUTH_1$, the second re-updated threshold voltage $VU2TH_2$ and the third updated threshold voltage $VUTH_3$, and the first data level comparator 114-1 through the fourth data level comparator 114-4 compare the level of the data corresponding to the data "01" included in the signal $EQ_{OUT}$ with the first reference data level $DLR_1$, the second updated reference data level $DLUR_2$, the third updated reference data level $DLUR_3$ and the fourth reference data level $DLR_4$.

Since the level of the data included in the signal $EQ_{OUT}$ corresponds to data "10", the first threshold voltage comparator 112-1 through the third threshold voltage comparator 112-3 should determine the level as the third data level $DL_3$. In addition, the third data level comparator 114-3 outputs $DLCP_3=0$ or $DLCP_3=1$ according to the result of comparison between the level of the data included in the signal $EQ_{OUT}$ and the third updated reference data level $DLUR_3$. That is, the third data level comparator 114-3 outputs $DLCP_3=0$ or $DLCP_3=1$ depending on which one of the level of the data included in the signal $EQ_{OUT}$ and the third updated reference data level $DLUR_3$ is greater.

Here, when the reference data level is updated by the previous data, the reference data level compared with the current data included in the signal $EQ_{OUT}$ is always the updated (or re-updated) reference data level.

The comparison result is transmitted to the controller 130. The controller 130 increases or decreases the third updated reference data level $DLUR_3$ according to the value of $DLCP_3$ to generate a third re-updated reference data level DLU2R3, and generates a second re-re-updated threshold voltage $VU3TH_2$ and a third re-updated threshold voltage $VU2TH_3$ according to the equations 12 and 13 below, respectively.

$$VU3TH_2 = \frac{DLU2R_3 + DLUR_2}{2} \quad \text{[Equation 14]}$$

$$VU2TH_3 = \frac{DLR_4 + DLU2R_3}{2} \quad \text{[Equation 15]}$$

A third re-updated reference data level $DLU2R_3$, a second re-re-updated threshold voltage $VU3TH_2$, and a third re-updated threshold voltage $VU2T_3$ are transmitted to the sampler 110*a*.

Figure 8E:
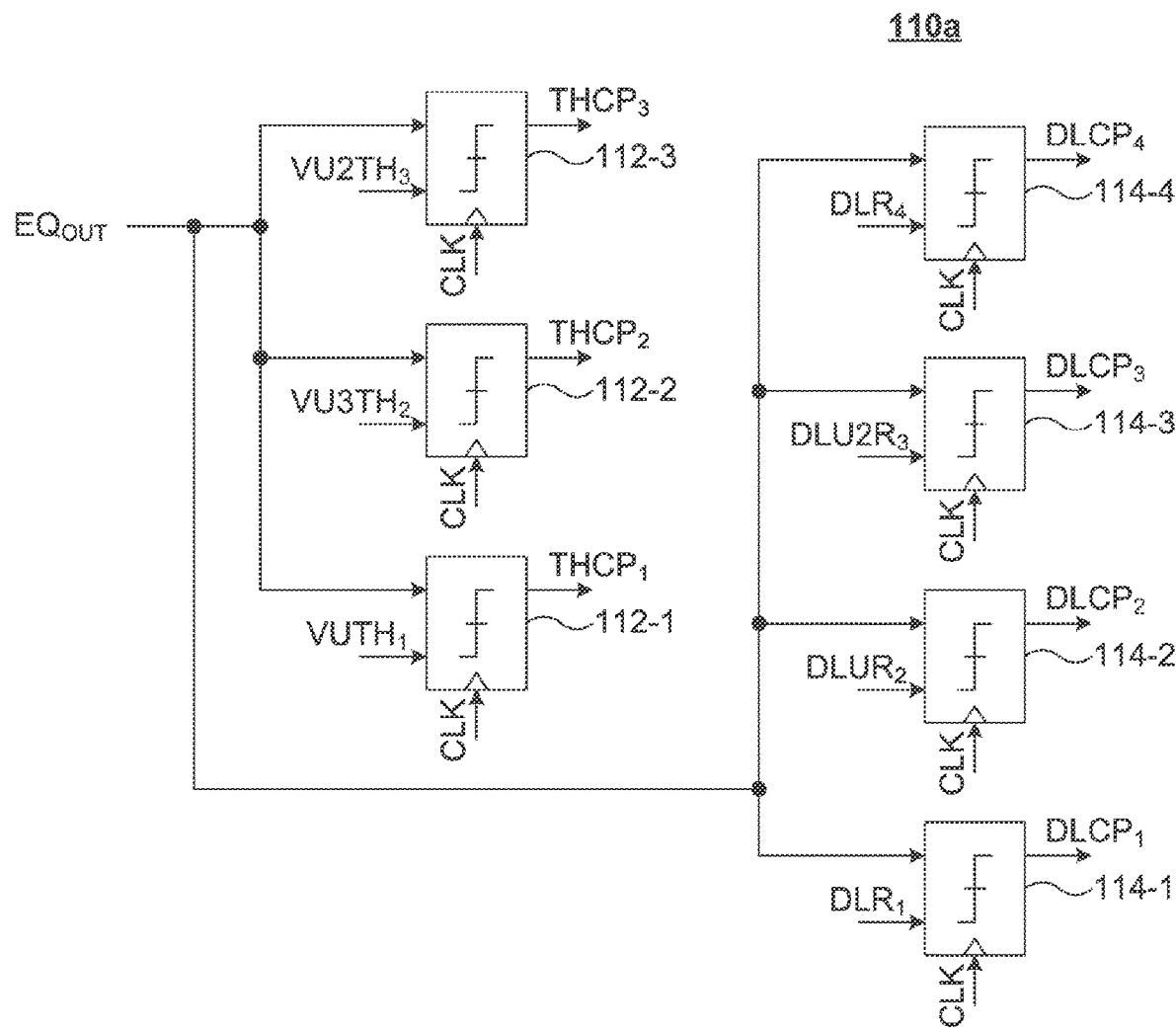

Once the third re-updated reference data level $DLU2R_3$, the second re-re-updated threshold voltage $VU3TH_2$ and the third re-updated threshold voltage $VU2TH_3$ are received, the sampler 110*a* performs a comparison of the next data "00" as shown in FIG. 8E.

Specifically, the received data "00" is equalized by the equalizer 100 and outputted as an equalized signal $EQ_{OUT}$, which is then inputted to the sampler 110*a*.

As shown in FIG. 8E, the signal $EQ_{OUT}$ is inputted into the first threshold voltage comparator 112-1 through the third threshold voltage comparator 112-3 and also into the first data level comparator 114-1 through the fourth data level comparator 114-4, and is compared therewith. That is, the first threshold voltage comparator 112-1 through the third threshold voltage comparator 112-3 compare the level of the data corresponding to the data "00" included in the signal $EQ_{OUT}$ with the first updated threshold voltage $VUTH_1$, the second re-re-updated threshold voltage $VU3TH_2$ and the third re-updated threshold voltage $VU2TH_3$, and the first data level comparator 114-1 through the fourth data level comparator 114-4 compare the level of the data corresponding to the data "00" included in the signal $EQ_{OUT}$ with the first reference data level $DLR_1$, the second updated reference data level $DLUR_2$, the third re-updated reference data level $DLU2R_3$ and the fourth reference data level $DLR_4$.

Since the level of the data included in the signal $EQ_{OUT}$ corresponds to data "00", the first threshold voltage comparator 112-1 through the third threshold voltage comparator 112-3 should determine the level as the first data level $DL_1$. In addition, the first data level comparator 114-1 outputs $DLCP_1=0$ or $DLCP_1=1$ according to the result of comparison between the level of the data included in the signal $EQ_{OUT}$ and the first reference data level $DLR_1$. That is, the first data level comparator 114-1 outputs $DLCP_1=0$ or $DLCP_1=1$ depending on which one of the level of the data included in the signal $EQ_{OUT}$ and the first reference data level $DLR_1$ is greater.

The comparison result is transmitted to the controller 130. The controller 130 increases or decreases the first reference data level $DLR_1$ according to the value of $DLCP_1$ to generate an first updated reference data level $DLUR_1$, and generates a first re-updated threshold voltage $VU2TH_1$ according to the equation 16 below.

$$VU2TH_1 = \frac{DLUR_2 + DLUR_1}{2} \qquad [\text{Equation 16}]$$

The first updated reference data level $DLUR_1$ and the first re-updated threshold voltage $VU2TH_1$ are transmitted to the sampler 110a.

Figure 8F:
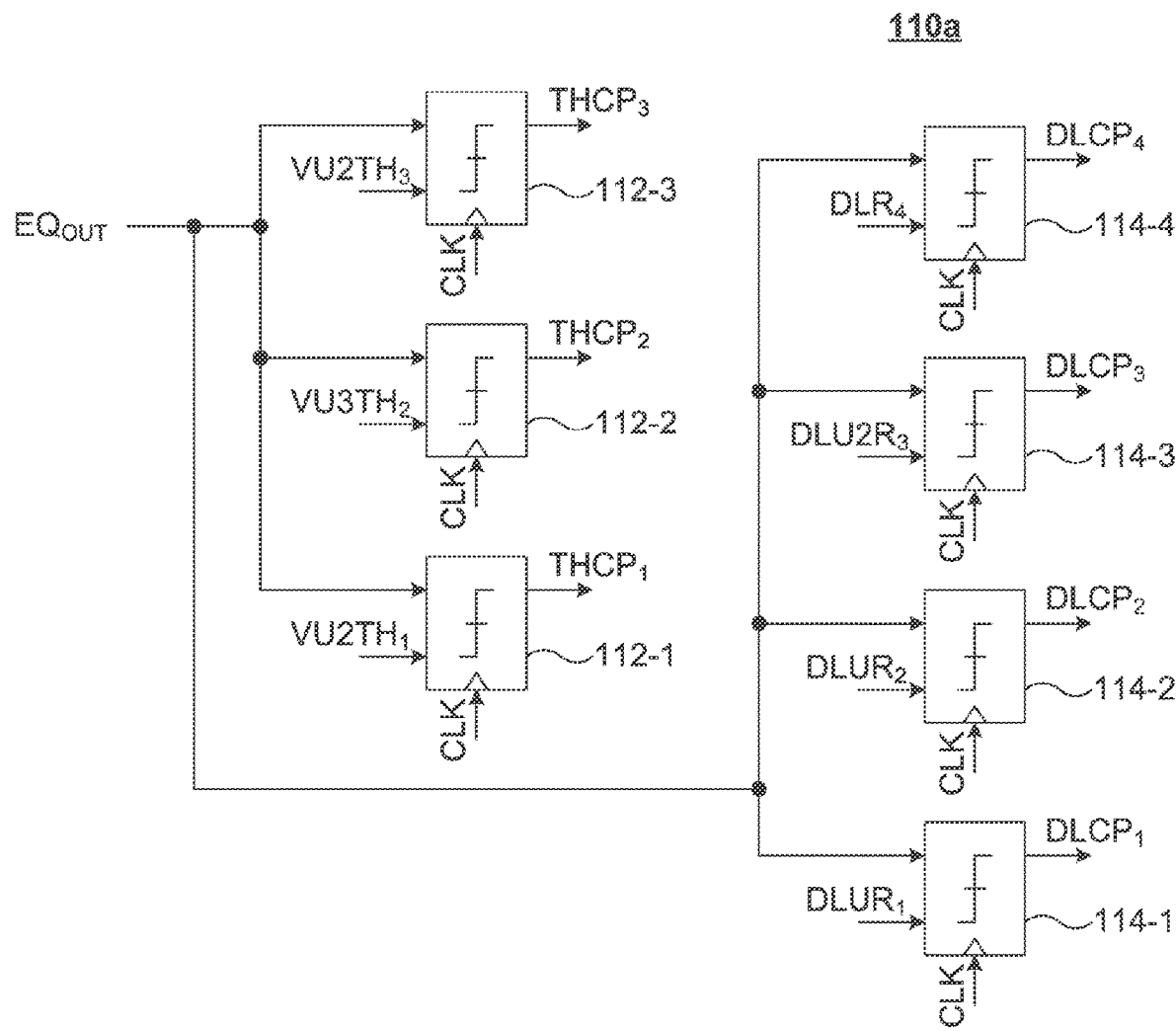

Once the first updated reference data level $DLUR_1$ and the first re-updated threshold voltage $VU2TH_1$ are received, the sampler 110a performs a comparison of the next data as shown in FIG. 8F, and the controller updates the reference data level and the threshold voltage.

Hereinafter, a method of adaptively adjusting threshold voltages of a PAM-N receiver according to an embodiment of the present invention will be described in detail.

Figure 10:
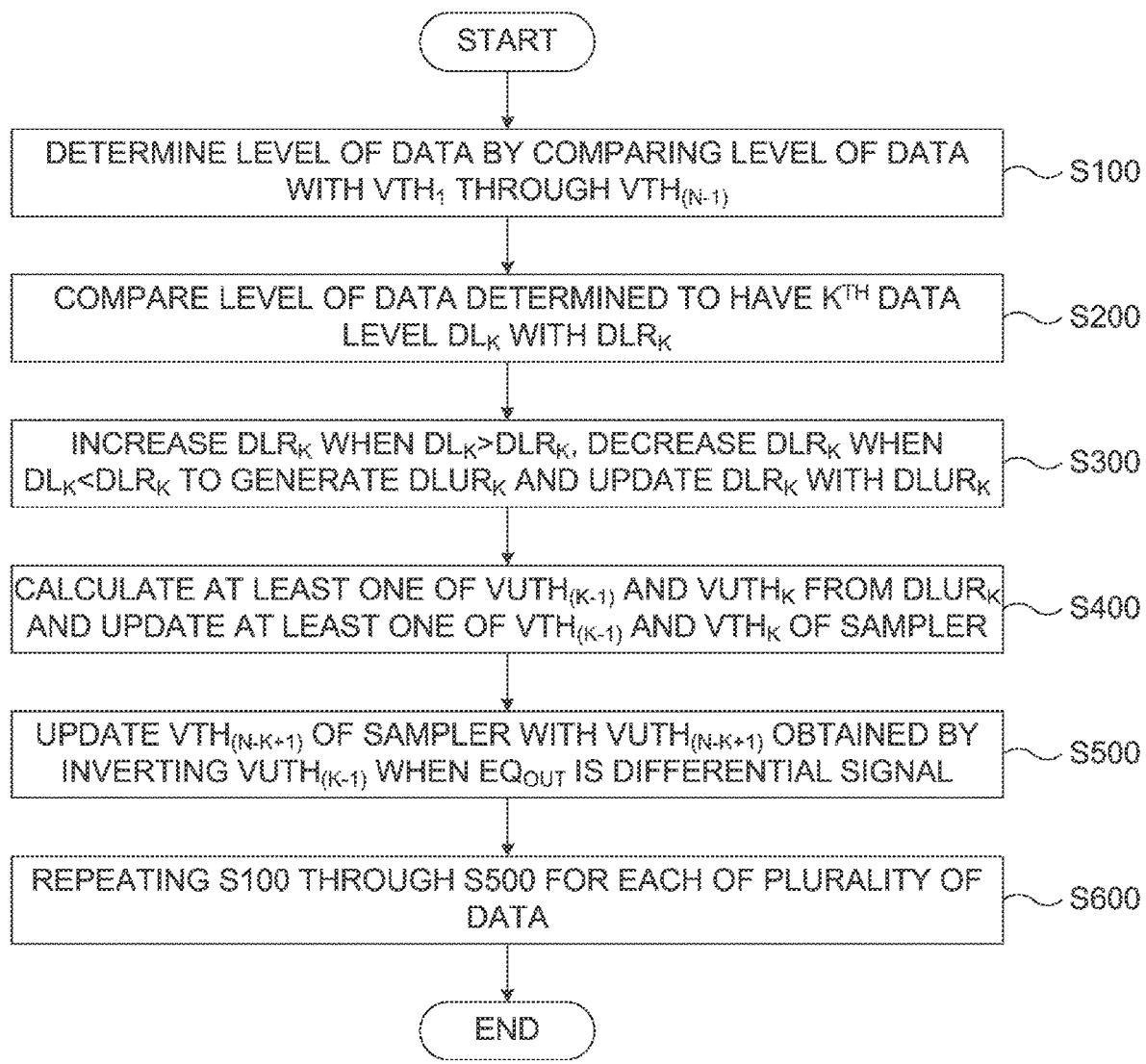
FIG. 10 is a flowchart illustrating a method of adaptively adjusting threshold voltages according to an embodiment of the present invention.

FIG. 10 is a flowchart illustrating a method of adaptively adjusting threshold voltages of a PAM-N receiver according to an embodiment of the present invention. The method of adaptively adjusting threshold voltages of a PAM-N receiver according to an embodiment of the present invention is performed in the PAM-N receiver shown in FIG. 6, and as described above, the level of the data included in the received signal RS or the equalized signal $EQ_{OUT}$ is one of the first data level $DL_1$ through the $N^{th}$ data level $DL_N$.

Hereinafter, any one data level selected from the first data level $DL_1$ through the $N^{th}$ data level $DL_N$ is referred to as "$K^{th}$ data level $DL_K$," and the data level which is one level lower than the $K^{th}$ data level $DL_K$ is referred to as "$(K-1)^{th}$ data level $DL_{(K-1)}$" as described above with reference to FIGS. 5 and 6.

Referring to FIG. 10, the sampler 110 compares the level of the data included in the equalized signal $EQ_{OUT}$ with the first threshold voltage $VTH_1$ through the $(N-1)^{th}$ threshold voltage $VTH_{(N-1)}$ to determine the data level (S100).

Specifically, as described above with reference to FIG. 7A, the first threshold voltage comparator 112-1 through the $(N-1)^{th}$ threshold voltage comparator 112-(N-1) of the sampler 110 compare the level of each data included in the signal $EQ_{OUT}$ with the first threshold voltage $VTH_1$ through the $(N-1)^{th}$ threshold voltage $VTH_{(N-1)}$, and the comparison result is outputted.

For example, the first threshold voltage comparator 112-1 compares the signal $EQ_{OUT}$ with the first threshold voltage $VTH_1$ for each clock CLK and outputs a signal $THCP_1$ representing a comparison result. That is, the first threshold voltage comparator 112-1 outputs $THCP_1=1$ for each data when the level of the data included in the signal $EQ_{OUT}$ is greater than the first threshold voltage $VTH_1$, and outputs $THCP_1=0$ for each data when the level of the data included in the signal $EQ_{OUT}$ is smaller than the first threshold voltage $VTH_1$.

The second threshold voltage comparator 112-2 compares the signal $EQ_{OUT}$ with the second threshold voltage $VTH_2$ for each clock CLK and outputs a signal $THCP_2$ representing a comparison result. That is, the second threshold voltage comparator 112-2 outputs $THCP_2=1$ for each data when the level of the data included in the signal $EQ_{OUT}$ is greater than the second threshold voltage $VTH_2$, and outputs $THCP_2=0$ for each data when the level of the data included in the signal $EQ_{OUT}$ is smaller than the second threshold voltage $VTH_2$.

Similarly, the $(N-2)^{th}$ threshold voltage comparator 112-(N-2) compares the signal $EQ_{OUT}$ with the $(N-2)^{th}$ threshold voltage $VTH_{(N-2)}$ for each clock CLK and outputs a signal $THCP_{(N-2)}$ representing a comparison result. That is, the $(N-2)^{th}$ threshold voltage comparator 112-(N-2) outputs $THCP_{(N-2)}=1$ for each data when the level of the data included in the signal $EQ_{OUT}$ is greater than the $(N-2)^{th}$ threshold voltage $VTH_{(N-2)}$, and outputs $THCP_{(N-2)}=0$ for each data when the level of the data included in the signal $EQ_{OUT}$ is smaller than the $(N-2)^{th}$ threshold voltage $VTH_{(N-2)}$.

Similarly, the $(N-1)^{th}$ threshold voltage comparator 112-(N-1) compares the signal $EQ_{OUT}$ with the $(N-1)^{th}$ threshold voltage $VTH_{(N-1)}$ for each clock CLK and outputs a signal $THCP_{(N-1)}$ representing a comparison result. That is, the $(N-1)^{th}$ threshold voltage comparator 112-(N-1) outputs $THCP_{(N-1)}=1$ for each data when the level of the data included in the signal $EQ_{OUT}$ is greater than the $(N-1)^{th}$ threshold voltage $VTH_{(N-1)}$, and outputs $THCP_{(N-1)}=0$ for each data when the level of the data included in the signal $EQ_{OUT}$ is smaller than the $(N-1)^{th}$ threshold voltage $VTH_{(N-1)}$.

Thereafter, the sampler 110 compares the level of the data determined to have the $K^{th}$ data level $DL_K$ in step S100 with the $K^{th}$ reference data level $DLR_K$ (S200).

Specifically, when a data is determined to have a level of the $K^{th}$ data level $DL_K$ in step S100, the level of this data is compared with the $K^{th}$ reference data level $DLR_K$ to determine which one of the level of this data and the $K^{th}$ reference data level $DLR_K$ is greater. Here, the $K^{th}$ reference data level $DLR_K$ represents one of the first reference data level $DLR_1$ through the $N^{th}$ reference data level $DLR_N$, and as described above, the comparison may be performed for each natural number K satisfying $1 \leq K \leq N$.

For example, when a data is determined to have a level of the first data level $DL_1$ in step S100 (i.e. K=1), the level of this data is compared with the first reference data level $DLR_1$ to determine which one of the level of this data and the first reference data level $DLR_1$ is greater. Similarly, when a data is determined to have a level of the fifth data level $DL_5$ in step S100 (i.e. K=5), the level of this data is compared with the fifth reference data level $DLR_5$ to determine which one of the level of this data and the fifth reference data level $DLR_5$ is greater. When a data is determined to have a level of the $N^{th}$ data level $DL_N$ in step S100 (i.e. K=N), the level of this data is compared with the $N^{th}$ reference data level $DLR_N$ to determine which one of the level of this data and the $N^{th}$ reference data level $DLR_N$ is greater.

Thereafter, the controller 130 increases the $K^{th}$ reference data level $DLR_K$ when $[DL_K > DLR_K]$ or decreases the $K^{th}$ reference data level $DLR_K$ when $[DL_K < DLR_K]$ according to the comparison result obtained in step S200 to generate a $K^{th}$ updated reference data level $DLUR_K$, and the $K^{th}$ reference data level $DLR_K$ is updated with the $K^{th}$ updated (replaced) reference data level $DLUR_K$ (S300).

Specifically, when the data included in the signal $EQ_{OUT}$ is determined to have a level of the $K^{th}$ data level $DL_K$ by the first threshold voltage comparator 112-1 through the $(N-1)^{th}$ threshold voltage comparator 112-(N-1), and the signal $DLCP_K$ outputted by the $K^{th}$ data level comparator 114-K is "1" (i.e. $DL_K > DLR_K$ as shown in FIG. 9A), the reference data level controller 134 increases the $K^{th}$ reference data level $DLR_K$ by a predetermined voltage to generate the $K^{th}$ updated reference data level $DLUR_K$.

In addition, for example, when the data included in the signal $EQ_{OUT}$ is determined to have a level of the $K^{th}$ data level $DL_K$ by the first threshold voltage comparator 112-1 through the $(N-1)^{th}$ threshold voltage comparator 112-(N-1), and the signal $DLCP_K$ outputted by the $K^{th}$ data level comparator 114-K is "0" (i.e. $DL_K < DLR_K$ as shown in FIG. 9B), the reference data level controller 134 decreases the $K^{th}$ reference data level $DLR_K$ by a predetermined voltage to generate the $K^{th}$ updated reference data level $DLUR_K$.

Thereafter, the controller 130 updates at least one of $(K-1)^{th}$ threshold voltage $VTH_{(K-1)}$ and $K^{th}$ threshold voltage $VTH_K$ with $(K-1)^{th}$ updated threshold voltage $VUTH_{(K-1)}$ and $K^{th}$ updated threshold voltage $VUTH_K$ by calculating at least one of the $(K-1)^{th}$ updated threshold voltage $VUTH_{(K-1)}$ and the $K^{th}$ updated threshold voltage $VUTH_K$ from the $K^{th}$ updated reference data level $DLUR_K$ generated in S300 (S400).

Hereinafter, step S400 will be described in detail with reference to FIG. 11.

Figure 11:
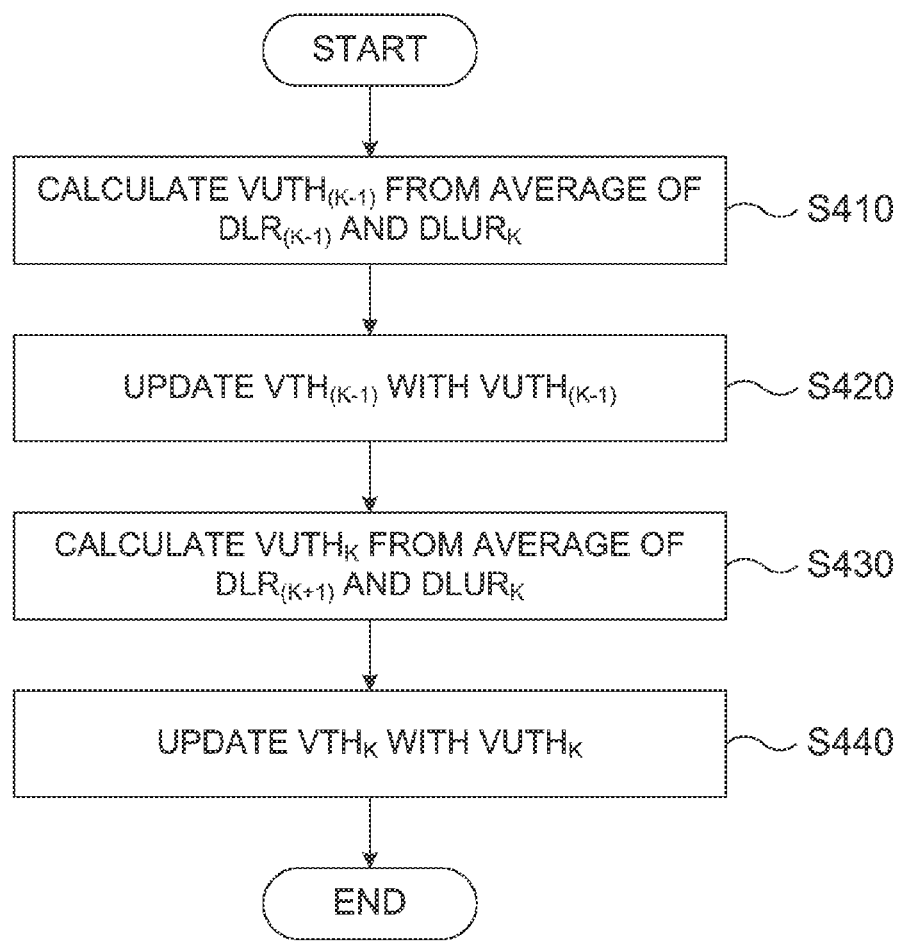
FIG. 11 is a flowchart illustrating step S400 in detail.

FIG. 11 is a flowchart illustrating in detail step S400 including steps S410 through S440.

Referring to FIG. 11, as in the equation 4 above, the $(K-1)^{th}$ updated threshold voltage $VUTH_{(K-1)}$ is calculated from the average of the $(K-1)^{th}$ reference data level $DLR_{(K-1)}$ and the $K^{th}$ updated reference data level $DLUR_K$ (S410).

Thereafter, the $(K-1)^{th}$ threshold voltage $VTH_{(K-1)}$ is updated with the $(K-1)^{th}$ updated threshold voltage $VUTH_{(K-1)}$ (S420).

Thereafter, as in the equation 5 above, the $K^{th}$ updated threshold voltage $VUTH_K$ is calculated from the average of the $(K+1)^{th}$ reference data level $DLR_{(K+1)}$ and the $K^{th}$ updated reference data level $DLUR_K$ (S430).

Thereafter, the $K^{th}$ threshold voltage $VTH_K$ is updated with the $K^{th}$ updated threshold voltage $VUTH_K$ (S440).

According to an embodiment of the present invention, only steps S410 and S420, only steps S430 and S440, or all of steps S410 through S440 may be performed.

In one embodiment, when the first reference data level $DLR_1$ is adjusted to generate the first updated reference data level $DLUR_1$, only the first threshold voltage $VTH_1$ may be updated (that is, only the steps S430 and S440 are performed), and when the $N^{th}$ reference data level $DLR_N$ is adjusted to generate the $N^{th}$ updated reference data level $DLUR_N$, only the $(N-1)^{th}$ threshold voltage $VTH_{(N-1)}$ may be updated (that is, only the steps S410 and S420 are performed). In another embodiment, when any one of the second reference data level $DLR_2$ through the $(N-1)^{th}$ reference data level $DLR_{(N-1)}$ is adjusted, only the steps S410 and S420 may be performed, only the steps S430 and S440 may be performed, or all of the steps S410 through S440 may be performed.

Referring back to FIG. 10, when the received signal RS or the equalized signal $EQ_{OUT}$ is a differential signal, the $(N-K+1)^{th}$ threshold voltage $VTH_{(N-K+1)}$ of the sampler 110 may be updated with a $(N-K+1)^{th}$ updated threshold voltage $VUTH_{(N-K+1)}$ which is obtained by inverting the $(K-1)^{th}$ updated threshold voltage $VUTH_{(K-1)}$ (S500).

As described above, since the differential signal includes a differential pair consisting of non-inverted and inverted signals, a threshold voltage for the non-inverted signal may be inverted to obtain a threshold voltage for the inverted signal. Therefore, all of the first updated threshold voltage $VUTH_1$ through the $(N-1)^{th}$ updated threshold voltage $VUTH_{(N-1)}$ are not required to be calculated.

The received signal RS or the equalized signal $EQ_{OUT}$ includes a plurality of data, and by repeatedly performing the steps S100 through S500 for each of the plurality of data, the threshold voltage and the reference data level may be repeatedly updated (S600).

The PAM-N receiver and the threshold voltage control method according to the present invention have the following advantages.

(1) Since the threshold voltages are adaptively adjusted according to the level of the data included in the received signal, threshold voltages optimized for the received signal may be obtained.

(2) Since the value of the received data is determined using the threshold voltages which have been subjected to optimization, the value of the received data may be determined accurately.

What is claimed is:

1. A method of adjusting threshold voltages of a PAM-N receiver comprising a sampler comparing a level of data contained in an equalized signal EQOUT with first reference data level DLR1 through Nth reference data level DLRN and first threshold voltage VTH1 through (N−1)th threshold voltage VTH(N−1), the method comprising:
(a) determining the level of the data by comparing the data in the equalized signal $EQ_{OUT}$ with the first threshold voltage VTH1 through the (N−1)th threshold voltage VTH(N−1);
(b) comparing the level of the data determined in (a) as Kth data level DLK with Kth reference data level DLRK;
(c) increasing the Kth reference data level DLRK when DLK is greater than DLRK according to comparison result obtained in (b) and decreasing the Kth reference data level DLRK when DLK is smaller than DLRK according to the comparison result obtained in (b) to generate Kth updated reference data level DLURK; and
(d) updating at least one of (K−1)th threshold voltage VTH(K−1) and Kth threshold voltage VTHK with (K−1)th updated threshold voltage VUTH(K−1) and Kth updated threshold voltage VUTHK by calculating at least one of the (K−1)th updated threshold voltage VUTH(K−1) and the Kth updated threshold voltage VUTHK from the Kth updated reference data level DLURK (where N is a natural number equal to or greater than 2, K is a natural number satisfying 1≤K≤N, DLK is one of DL1 through DLN satisfying DL1<DL2<. . .<DL(N−1)<DLN, DLRK is one of DLR1 through DLRN satisfying DLR1<DLR2<. . . <DLR(N−1)<DLRN, VTH(K−1) is one of VTH1 through VTH(N−1) satisfying VTH1<VTH2<. . . <VTH(N−2)<VTH(N−1)).

2. The method of claim 1, further comprising: (e) updating (N−K+1)th threshold voltage VTH(N−K+1) with (N−K+1)th updated threshold voltage VUTH(N−K−1) obtained by inverting the (K−1)th updated threshold voltage VUTH(K−1) when the equalized signal EQOUT is a differential signal (where, K is a natural number satisfying N/2+1<K≤N).

3. The method of claim 1, wherein (d) comprises:
(d-1) calculating the (K−1)th updated threshold voltage VUTH(K−1) from an average of (K−1)th reference data level DLR(K−1) and the Kth updated reference data level DLURK; and
(d-2) updating the (K−1)th threshold voltage VTH(K−1) with the (K−1)th updated threshold voltage VUTH(K−1).

4. The method of claim 1, wherein (d) comprises:
(d-3) calculating the Kth updated threshold voltage VUTHK from an average of (K+1)th reference data level DLR(K+1) and the Kth updated reference data level DLURK; and
(d-4) updating the Kth threshold voltage VTHK with the Kth updated threshold voltage VUTHK.

5. The method of claim 1, wherein (d) comprises:
(d-1) calculating the (K−1)th updated threshold voltage VUTH(K−1) from an average of (K−1)th reference data level DLR(K−1) and the Kth updated reference data level DLURK;
(d-2) updating the (K−1)th threshold voltage VTH(K−1) with the (K−1)th updated threshold voltage VUTH(K−1);
(d-3) calculating the Kth updated threshold voltage VUTHK from an average of (K+1)th reference data level DLR(K+1) and the Kth updated reference data level DLURK; and
(d-4) updating the Kth threshold voltage VTHK with the Kth updated threshold voltage VUTHK.

6. The method of claim 1, further comprising: (h) performing, when the received signal contains a plurality of data, (a) through (d) for each of the plurality of data.

7. A PAM-N receiver comprising:
an equalizer generating an equalized signal EQOUT containing data having at least one of first data level DL1 through Nth data level DLN obtained by equalizing a received signal;
a sampler determining a level of the data by comparing the data in the equalized signal $EQ_{OUT}$ with first reference data level DLR1 through Nth reference data level DLRN and first threshold voltage VTH1 through (N−1)th threshold voltage VTH(N−1); and
a controller adjusting the first reference data level DLR1 through the Nth reference data level DLRN and the first threshold voltage VTH1 through the (N−1)th threshold voltage VTH(N−1) according to an output signal SMPLOUT indicating a result of comparison performed by the sampler;
wherein the sampler comprises a Kth data level comparator outputting: "1" as the output signal SMPLOUT when DLK is greater than DLRK; and "0" as the output signal SMPLOUT when DLK is smaller than DLRK by comparing the level of the data determined to have Kth data level DLK with Kth reference data level DLRK; and
wherein the controller comprises: a reference data level controller generating an Kth updated reference data level DLURK obtained by increasing the Kth reference data level DLRK when an output of the Kth data level comparator is "1" and by decreasing the Kth reference data level DLRK when the output of the Kth data level comparator is "0"; and a threshold voltage controller updating at least one of (K−1)th threshold voltage VTH(K−1) and Kth threshold voltage VTHK with (K−1)th updated threshold voltage VUTH(K−1) and Kth updated threshold voltage VUTHK by calculating at least one of the (K−1)th updated threshold voltage VUTH(K−1) and the Kth updated threshold voltage VUTHK from the Kth updated reference data level DLURK (where N is a natural number equal to or greater than 2, K is a natural number satisfying 1≤K≤N, DLK is one of DL1 through DLN satisfying DL1<DL2<. . .<DL(N−1)<DLN, DLRK is one of DLR1 through DLRN satisfying DLR1<DLR2<. . . <DLR(N−1)<DLRN, VTH(K−1) is one of VTH1 through VTH(N−1) satisfying VTH1<VTH2<. . . <VTH(N−2)<VTH(N−1)).

8. The PAM-N receiver of claim 7, wherein the threshold voltage controller updates (N−K+1)th threshold voltage VTH(N−K+1) with (N−K+1)th updated threshold voltage VUTH(N−K+1) obtained by inverting the (K−1)th updated threshold voltage VUTH(K−1) when the equalized signal EQOUT is a differential signal (where, K is a natural number satisfying N/2+1<K≤A).

9. The PAM-N receiver of claim 7, wherein the threshold voltage controller: calculates the (K−1)th updated threshold voltage VUTH(K−1) from an average of (K−1)th reference data level DLR(K−1) and the Kth updated reference data level DLURK; and
updates the (K−1)th threshold voltage VTH(K−1) with the (K−1)th updated threshold voltage VUTH(K−1).

10. The PAM-N receiver of claim 7, wherein the threshold voltage controller: calculates the Kth updated threshold voltage VUTHK from an average of (K+1)th reference data level DLR(K+1) and the Kth updated reference data level DLURK; and updates the Kth threshold voltage VTHK with the Kth updated threshold voltage VUTHK.

* * * * *